United States Patent [19]
Azarmi et al.

[11] Patent Number: 5,905,715
[45] Date of Patent: May 18, 1999

[54] NETWORK MANAGEMENT SYSTEM FOR COMMUNICATIONS NETWORKS

[75] Inventors: Nader Azarmi, Colchester; Stephen Leslie Corley, Ipswich, both of United Kingdom

[73] Assignee: British Telecommunications public limited company, London, United Kingdom

[21] Appl. No.: 08/793,501
[22] PCT Filed: Sep. 1, 1995
[86] PCT No.: PCT/GB95/02070
§ 371 Date: Feb. 28, 1997
§ 102(e) Date: Feb. 28, 1997
[87] PCT Pub. No.: WO96/07281
PCT Pub. Date: Mar. 7, 1996

[30] Foreign Application Priority Data

Sep. 1, 1994 [EP] European Pat. Off. ............ 94306444
Jun. 19, 1995 [GB] United Kingdom ................. 9512422

[51] Int. Cl.⁶ ............................................. H01J 3/14
[52] U.S. Cl. .................... 370/244; 370/244; 370/248; 395/183.01; 371/20.1
[58] Field of Search ................................. 370/216, 241, 370/242, 243, 244, 248, 907, 395; 395/183.01, 183.07, 185.01; 371/20.1, 20.2

[56] References Cited

U.S. PATENT DOCUMENTS 5,475,732  12/1995  Pester, III .............................. 370/244
5,784,359   7/1998  Bencheck et al. ...................... 370/244
5,787,074   7/1998  Browmiller et al. ................... 370/244

Primary Examiner—Chi H. Pham
Assistant Examiner—Frank Duong
Attorney, Agent, or Firm—Nixon & Vanderhye P.C.

[57] ABSTRACT

A network management system for a communications network include management function software accessible to one or more workstations and incorporating a data store for management information. The network management system is structured to accommodate a layered model of the network and pays particular attention to the Service Management Layer/Network Management Layer interface. In fault and test management, the network management system incorporates elements to apply constraints, feature agreements, which elements then determine diagnosis and reporting procedures in response to fault or performance report or test inputs to the system. The system can be used to manage specific services, such as flexible bandwidth services, carried by selected network technology, such as Asynchronous Transfer Mode switching.

27 Claims, 21 Drawing Sheets

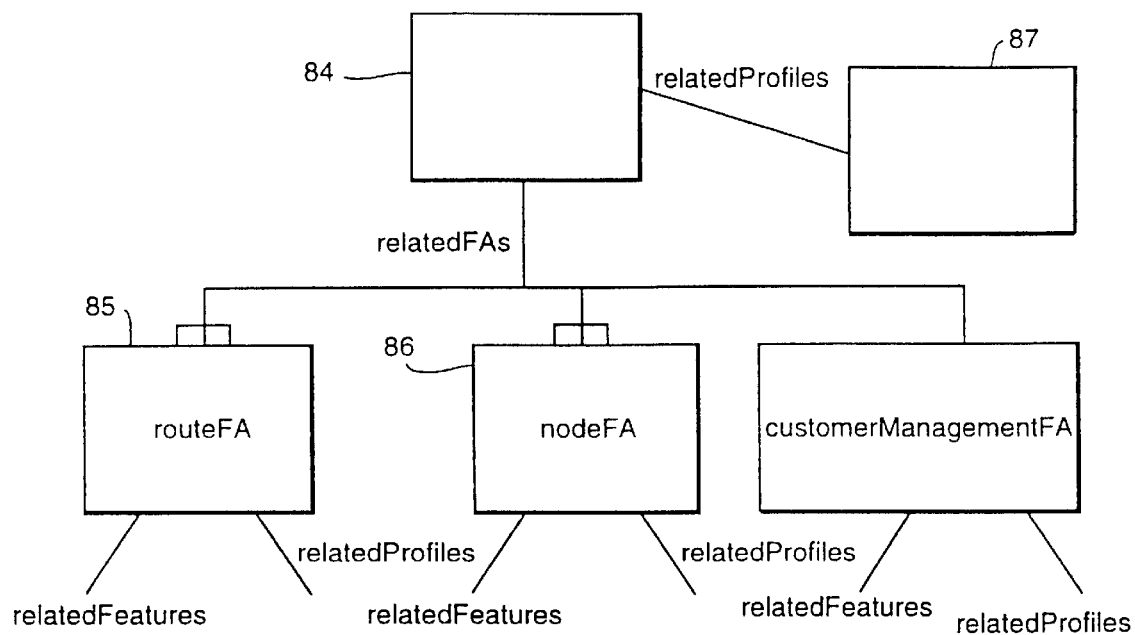
Fig.8iii.
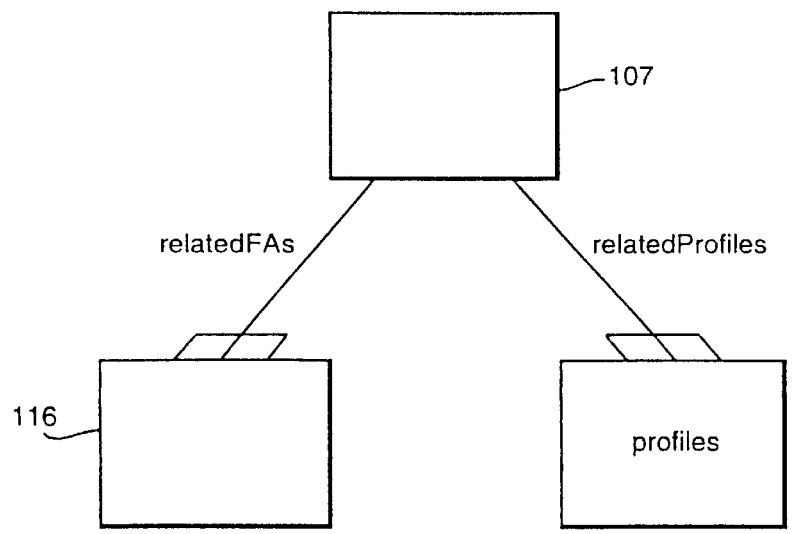
Fig.10iv.

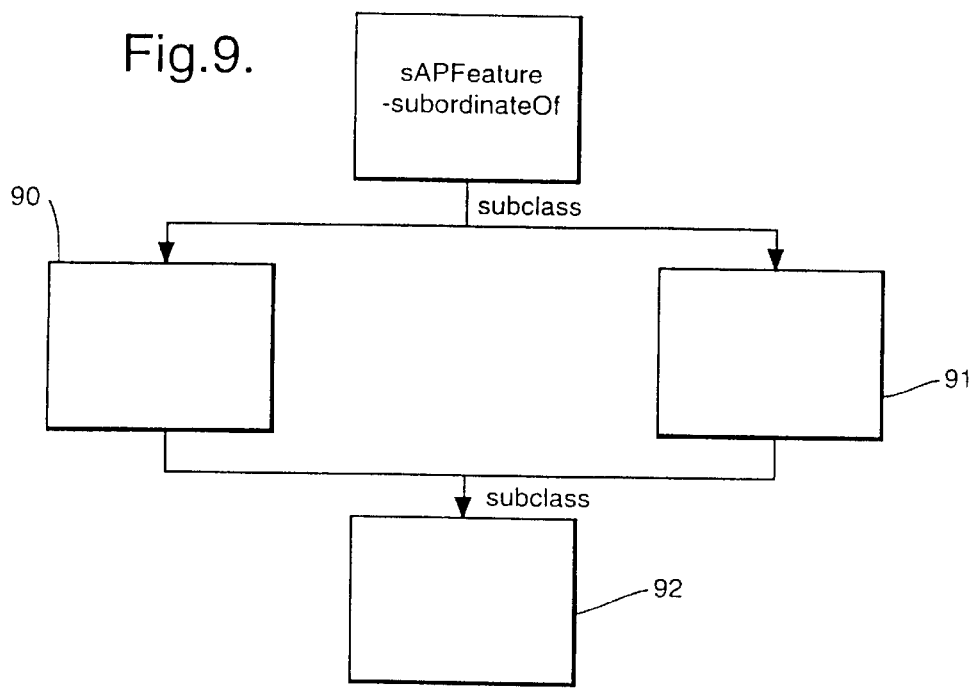
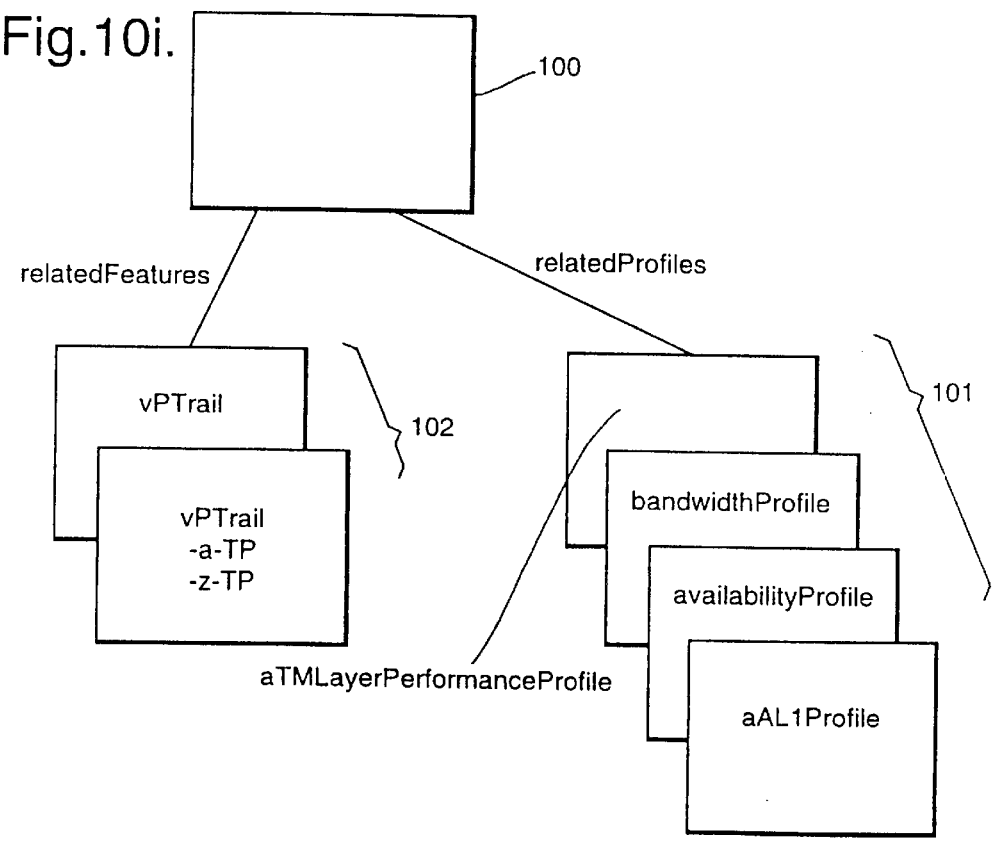

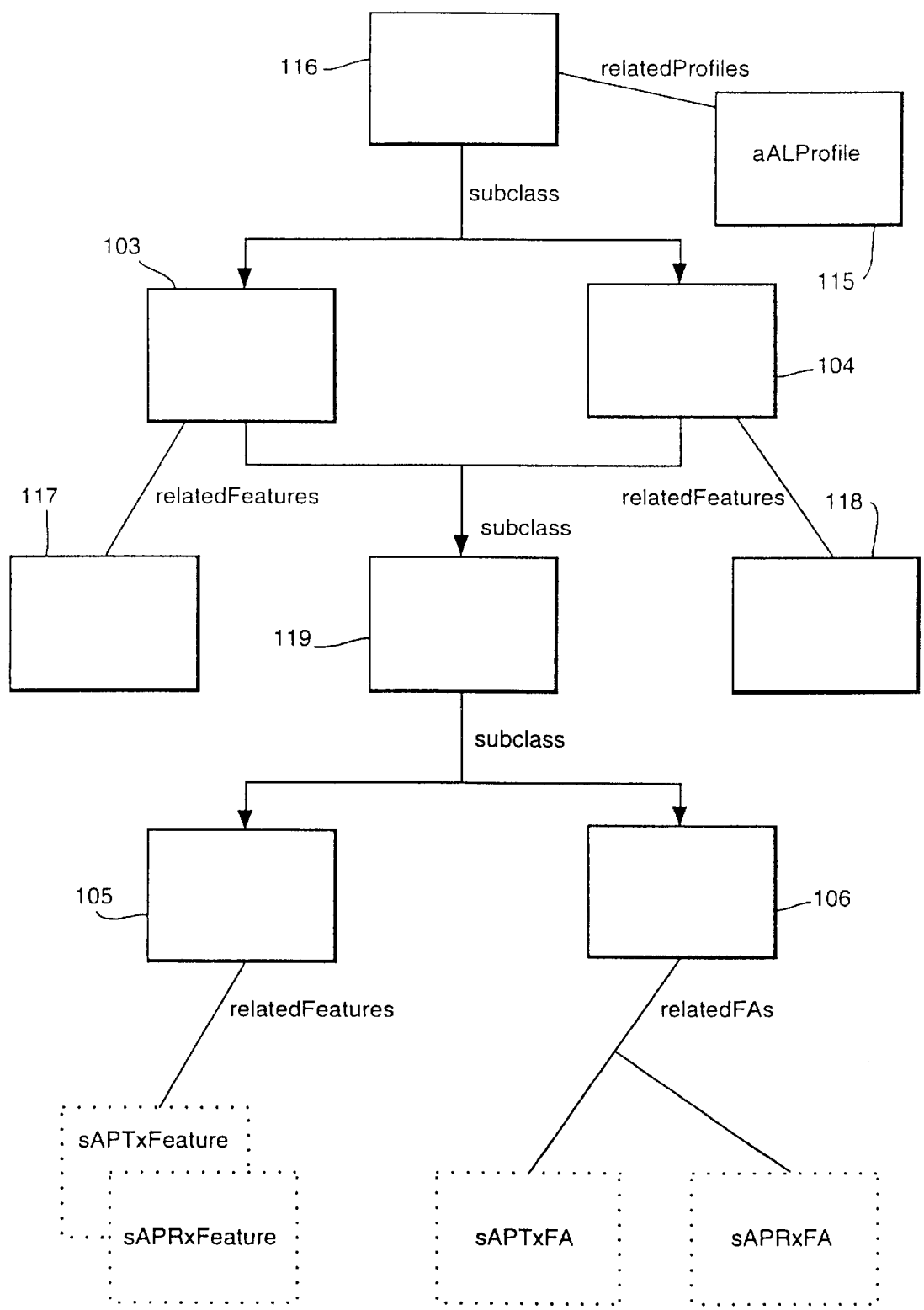

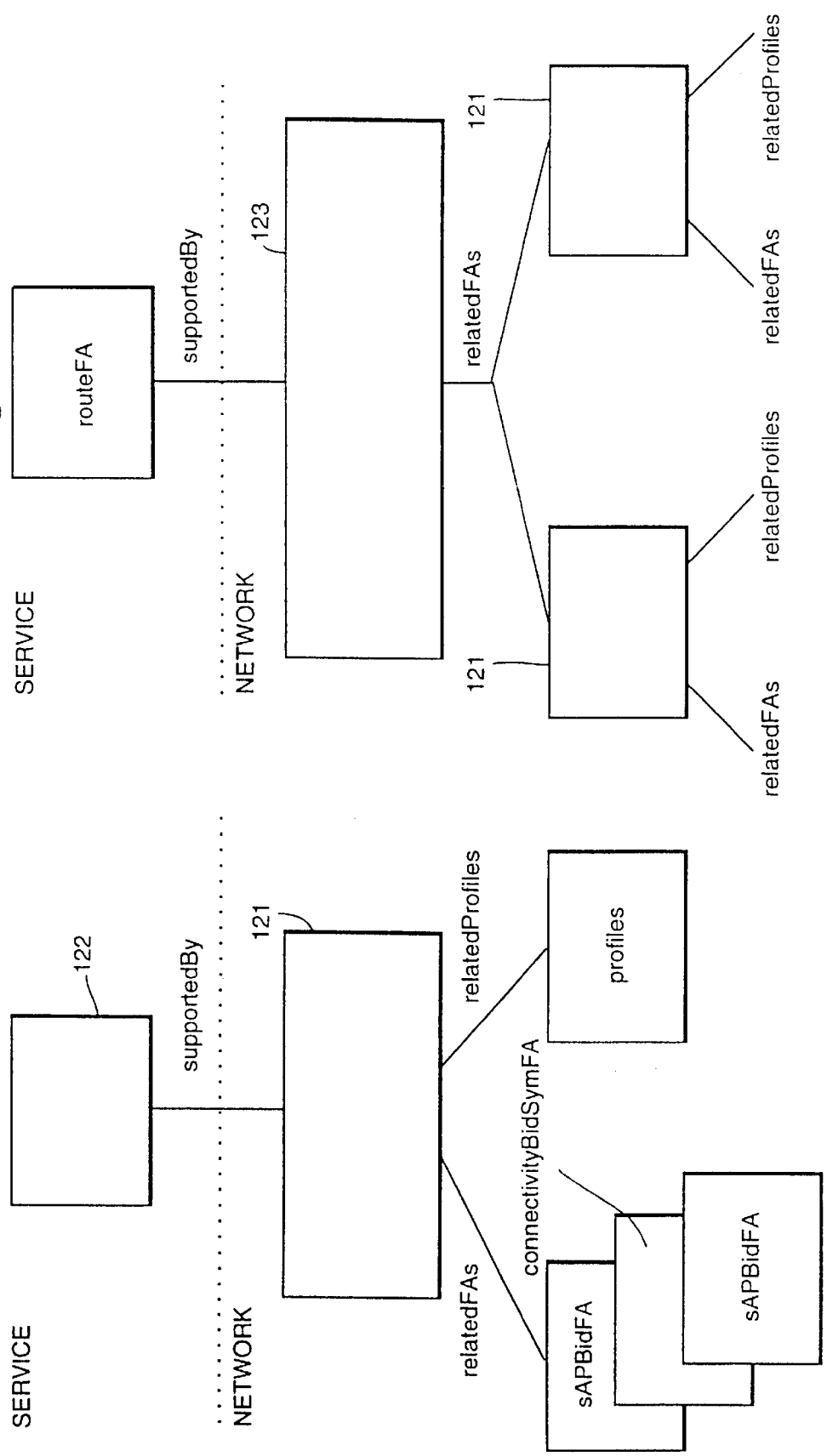

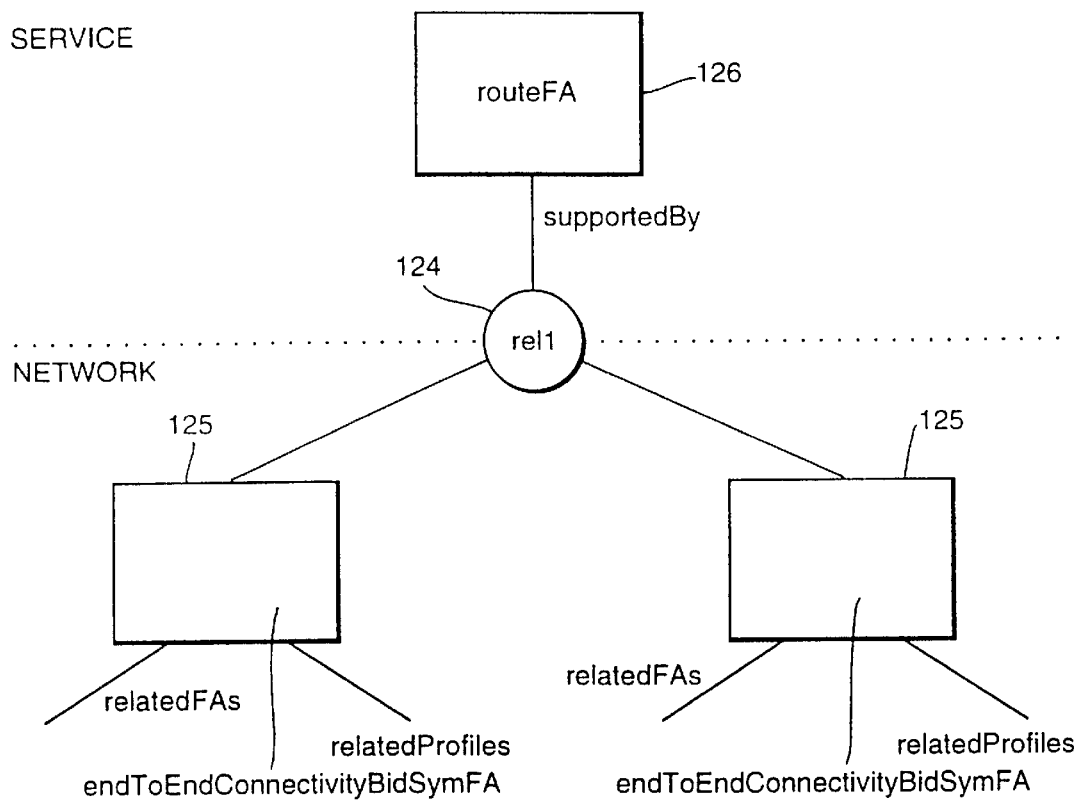
Fig.11iii.
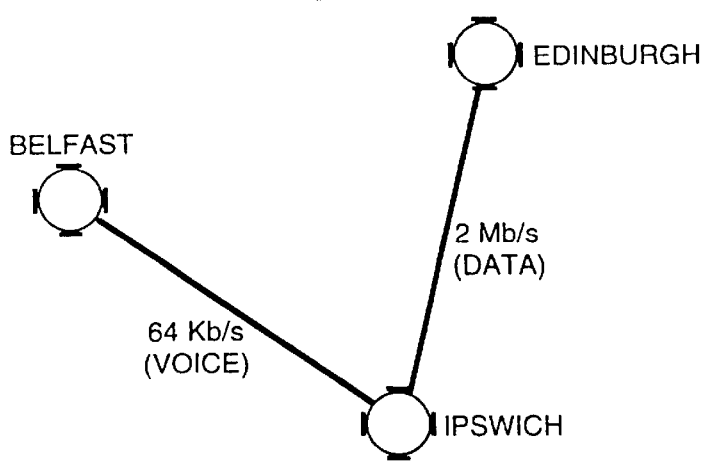
Fig.12.

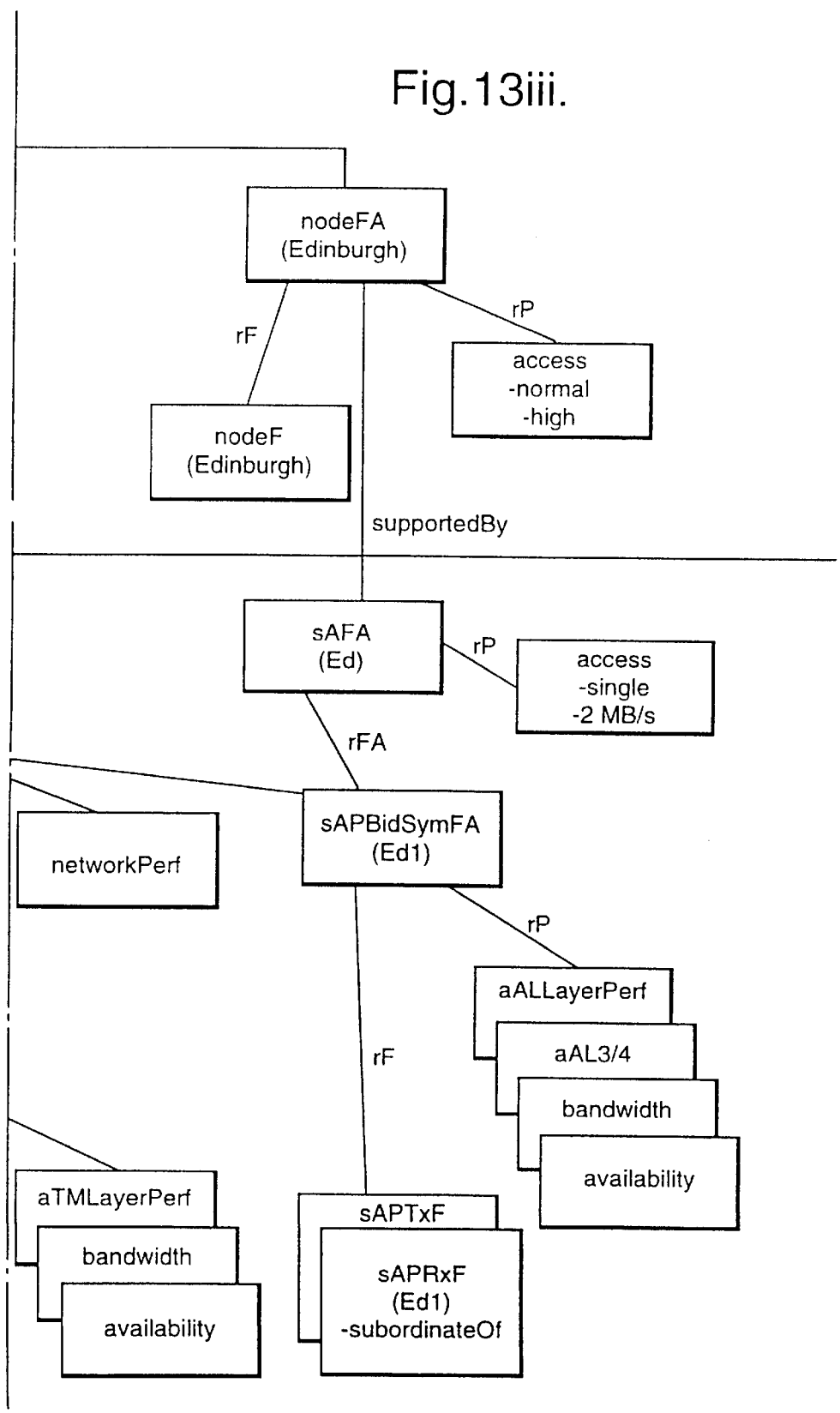
Fig.13iii.

NETWORK MANAGEMENT SYSTEM FOR COMMUNICATIONS NETWORKS

The present invention relates to network management systems for communications networks. It finds particular application, for instance, in any one or more of fault, test and performance management systems.

In providing and operating a communications network, it is clearly important that monitoring and control functionality is provided to support various management aspects of the network, including performance and configuration as well as fault management. In more recent times, not only does the network itself have to be managed, but the services provided by means of the network also have to be managed.

Various network management systems are known and published. For instance, network management is discussed in "Communications Networks: A First Course" by Jean Walrand, published in 1991 by Richard D Irwin Inc and Aksen Associates Inc, US. Another relevant publication is "Telecommunications Network Management into the 21st Century", edited by Salah Aidarous and Thomas Plevyak and copublished in 1994 by the Institution of Electrical Engineers (IEE) and the Institute of Electrical and Electronics Engineers, Inc, US.

In general, a network management system has to have interfaces with the network it is managing so that it can monitor or test various aspects such as the current configuration and traffic conditions, and whether it is performing satisfactorily, ie meeting any performance criteria applicable. Preferably, the system will be able to detect such indicators as performance deterioration so that faults can be predicted and acted on in advance. Another purpose of the interfaces is for output from the network management system to the network so as to correct or control aspects of the network.

Historically, the emphasis has inevitably been on monitoring and controlling the hardware of the network itself, the switches and multiplexors for instance which are carrying the traffic. The services provided by the networks were relatively simple. However, as communications has developed in recent times, with the huge proliferation in services as well as network hardware, network management systems have had to encompass functionality for installing, monitoring and controlling service functionality together with supporting technologies such as billing and charging.

In some cases, service management systems have been treated as separate entities from the network management systems and, in other cases, as different functions of the same equipment development.

It is important that the approach taken is consistent and flexible, so that the network operator or service provider can react quickly to problems and demands involving hardware or software of the networks, of the services, or arising at the customer interfaces, as well as to competitor activities, and it is clearly preferable if any strategy used is able to accommodate new networks and new services.

A management system for a network needs to have an interface to the network itself, in order to pick up information and output control messages for instance, and then to have a view of the network according to which it can process the information. Complex communications networks, the services they provide and the associated management systems, have been described for management purposes in terms of having different layers or domains. Such layers or domains have started with for instance the network equipment itself, the network layer, which is then monitored and controlled by means of a network management layer (NML). For services provided by the network, there may be a separate service management layer (SML).

A network management system of this type, structured according to functionality and viewed in terms of layers, has been published by the present applicant as an architecture known as the "Co-operative Network Architecture for Management" (CNA-M). Documentation in respect of CNA-M can be obtained from the CNA Secretariat, British Telecommunications plc, St. Vincent House, Ipswich, Suffolk IP1 1UX (UK). It defines a structural architecture within which business processes, and therefore management systems required to provide services on a network, are contained. Two principal layers of this architecture are the Service Management Layer (SML) and the Network Management Layer (NML). The SML provides co-ordination of all activities associated with the management of services provided on the relevant network. The NML provides processes by means of which the network itself can be planned and operated.

Clearly, activites relating to a particular layer in a network management system have an impact in other layers. For instance, a switch failure is directly relevant to the network layer but could have an impact on the services running on that switch, and therefore on the SML. It is thus very important in the management system that there can be close interaction between layers (or domains) of a network management system of this type and embodiments of the present invention are designed such that close and effective interaction is enabled between layers, or domains, of a service and network management system. According to a first aspect of the present invention, there is provided a management system for a communications network, for use in monitoring and controlling the provision of services by means of the network, wherein the management system comprises:

i) inputs for trigger signals containing information in respect of the network and/or a service provided thereby;

ii) data processing means for accessing and processing information in response to said trigger signals; and iii) outputs for issuing control and/or report signals in respect of the network and/or said services wherein the management system is provided with a data structure comprising sets of feature-describing data, each set identifying and describing a manageable aspect of the communications network, management rule profiles to be associated with selected sets of feature-describing data, each management rule profile containing management rules in respect of the feature described by the relevant set of feature-describing data, and association data sets for associating one or more management rule profiles with one or more selected sets of feature-describing data, said data processing means being adapted to respond to a trigger signal by identifying a set of feature-describing data and accessing a management rule profile, identified by an association data set in respect of the set of feature-describing data, and, if indicated by the profile or by an association data set or otherwise by the data structure, accessing at least one further association data set and a management rule profile identified by said further association data set, such that the management system is enabled to respond appropriately to the trigger signal.

Conveniently, the association data sets may be arranged in a hierarchical structure. This can employ a "supported by" relationship between association data sets which reflects a layered model of the network.

The trigger signals might arise for instance because there is a fault in a hardware element of the network. In that case the management system needs to be able to analyse the consequences of the fault and to determine whether management action needs to be taken. Management action might simply be a report to a customer, or might involve traffic rerouting for instance.

A trigger signal may instead arise because performance of the network or services provided thereby has degraded. In this case, management action by the system may be designed to allow corrective or avoiding action to be taken.

Alternatively, a trigger signal might arise because a customer or service provider requires a test to be done in relation to the network or its services. The management system will then have to be able to decide the nature of the test or tests to be done, and to report back the results.

Embodiments of the present invention allow problems and faults arising in relation to a network, and the manner in which their effects propagate, to be detected and controlled in spite of any inherent interface which may be present in the architecture or functionality of the management system. Since embodiments may also enable testing of the network and services, a full range of fault, test and performance management can be provided.

The sets of feature-describing data may identify network capabilities, such as capacity, or may identify services or service-supporting features. The principle of management systems according to embodiments of the present invention is that the data structure effectively decouples services from the networks on which they are provided. This can be particularly important for instance where one or more service providers are to provide services across one or more independent network operators' networks.

Management systems according to embodiments of the present invention can be designed for use with the sort of telecommunications networks used in the past, with software built into the switches, or for instance with the intelligent network architectures now being developed, or the like, where the network intelligence is provided away from the switches and is of much increased sophistication, in line with the proliferation of services being made available.

(Although reference may be made in this specification to network management systems, it will generally be the case, as a matter of practicality, that these systems will also provide service management functionality.)

The management rule profiles referred to above, in the description of a first aspect of the present invention, may hold data in relation to network constraints, such as capacity, or may hold data in relation to service constraints, such as conditions set out in service level agreements between a customer and a service provider and/or network operator. It is this, at least in part, which gives embodiments of the present invention the capability of managing across inherent interfaces of a management system, for instance between the service management and network management domains.

Service level agreements are usually between a network or service provider and a user or customer in respect of the network, and set out the service or services the user or customer has selected, together with the conditions the service provider has agreed to meet.

An embodiment of the first aspect of the present invention may be expressed as follows:
a management system for a communications network, the management system being structured according to a layered model of a managed network, which management system comprises:

i) inputs for trigger signals in respect of the network and/or a service provided thereby;

ii) data processing means for accessing and processing information in response to said trigger signals; and iii) outputs for issuing signals in respect of the network and/or said services wherein said data processing means comprises a data structure having a hierarchy of feature agreement data stores, each for use in retrieving data defining feature-specific requirements, at a layer of the network model, to support a set of operational-related conditions such as those of a service level agreement or the like.

The trigger signals might for instance be fault or performance reports indicating that a network element is malfunctioning. The management system might then respond by accessing the data structure at a level corresponding to a network management layer of the network model and use data accessible at that level to determine what network features might be affected and to what extent. The data could also indicate whether it is necessary to access the data structure at a second level. If no feature is affected, or features are only affected to a slight extent, then the management system may be able to trigger diagnosis and repair of the network without for instance having to generate a report to a customer.

Alternatively, a fault report might mean that one or more features provided by the network are seriously affected and consequently a service to a customer is affected and should be reported to the customer accordingly. The management system in this case will probably need to access the data structure at a series of levels in the hierarchy, to put in train not just diagnosis and repair to the network but also to issue consequential reports such as a fault report to the customer.

Achieving control of the management functions of the network is particularly difficult in terms of the interfaces between different levels of the network. Embodiments of the present invention can provide a framework for interfacing between the different levels, for example between the service and network management layers, and the feature agreement based data structure provides the relationship between the network and the services. Embodiments of the present invention allow fault detection and management not only in retrospect but also predictively, for instance capturing fault propagation into different layers. This latter aspect allows potential fault prevention as well as cure.

The emphasis above lies on fault management, and refers to a trigger signal being a fault report in respect of a network element. However, embodiments of the present invention could be used in managing other aspects of a network, such as test management or propagation of performance reports. If a customer requests information which necessitates a test of some aspect of a service, a feature or a network element, then the trigger signal might comprise a test request. In this the management system is likely to access a level of the data structure corresponding to a service management layer of the network model as a first step in determining what tests need to be applied and whether services, features and/or network elements need to be tested. Depending on the data accessed at that level of the data structure, the management system may need then to access a level corresponding to the network management layer of the network model. The signals issued by the management system in this scenario might be test signals, to generate tests of actual network elements, and subsequent test reports to convey results to the customer.

If a network condition occurs when a network component is malfunctioning such that its performance is degraded then this may cause a trigger signal to be generated which is compared with the feature and feature agreement data store appropriate to that level of the network or service management systems to determine whether the performance report should be propagated up to higher levels of management. This process can be applied iteratively at each successive level and may result in a performance report being sent either in real time or summarised in a periodic statistical report to the customer of the service.

According to a second aspect of the present invention, there is provided a method of managing a communications network, by means of a network management system incorporating a hierarchical data structure, levels oft the hierarchy corresponding to layers of a network model, and the data structure containing or having access to data defining feature-specific functional requirements for the network relevant to the respective layers, which method comprises:

i) receiving a trigger signal comprising information in respect of the network and/or a service provided thereby;

ii) responding to the trigger signal by accessing the data structure at a first level in the hierarchy;

iii) using data at the first level to process the information received; and iv) responding to the outcome of said processing to access the data structure at a second level of the hierarchy, as indicated by said outcome.

In general terms, a network management system according to an embodiment of the present invention for use with a layered model of the network incorporates a hierarchical data structure which can apply sets of conditions relevant to different layers of a network model in response to a trigger so as to determine a network management outcome. Looking at a network model having a network management layer below a service management layer, if the management system receives a fault report for a network element as the trigger, it will generally first apply a set of conditions from a level in the data structure equivalent to the network management layer and depending on the outcome, subsequently apply sets of conditions from elsewhere in the data structure. The relevant sets of conditions in each case are determined by feature agreement data stores embedded in the data structure.

If the management system receives a test request from a customer as the trigger, it will generally first apply a set of conditions from a level in the data structure equivalent to the service management layer, and then effectively move in the other direction across the SML/NML interface to apply a set of conditions from a level equivalent to the network management layer.

A network management system according to an embodiment of the present invention will now be described, by way of example only, with reference to the accompanying Figures, in which:

FIG. 9 shows a feature class hierarchy for use in a model for an asynchronous transfer mode (ATM) network;

FIG. 11 shows mapping between service features and ATM network features;

FIG. 12 shows the customer view of a simple service;

The following description of embodiments of the present invention is expressed in terms of object-oriented principles. These are known and relate to programming techniques in which entities in the real world are described in terms of software objects. Each software object comprises data relevant to the real world entity, which data can only be accessed by means of relevant process software. That is, the data is encapsulated in process software, presenting an integrated unit of data and behaviour. Objects can be grouped into classes, the objects in each class sharing the same attributes. Classes are arranged hierarchically, subclasses inheriting all the attributes of a parent class but sharing a common set of additional attributes. It may be that the only attributes necessary are those enabling a real world entity to be managed. Such an object is known as a managed object and these objects consequently are grouped into managed object classes.

It is not essential that embodiments of the present invention are built according to object-oriented principles, however, and the invention should not be seen as being limited in that way.

The network management system described below is set in the context of advanced networks and services, particularly flexible bandwidth service (FBS) provided by means of Asynchronous Transfer Mode (ATM) network technology. It is useful to have an overview of the services and network technology involved.

NETWORK MANAGEMENT SYSTEM TECHNICAL CONTEXT

Figure 16:
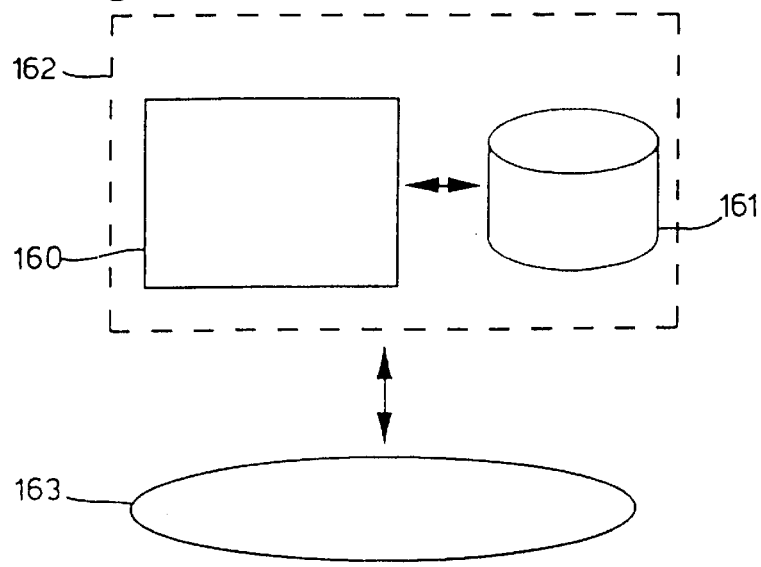
FIG. 16 shows in a block diagram a management system according to an embodiment of the invention, in combination with a communications network to be managed.

Referring to FIG. 16, a management system 162 for a communications network 163 will generally comprise management function software 160 accessible to one or more workstations (not shown), and incorporating one or more data stores 161 for management information. The technology on which a management system according to an embodiment of the present invention can be built is conventional in terms of the supporting hardware to this extent. For instance, for a major network the supporting hardware may comprise an IBM mainframe computer or, in the future increasingly, a distributed data processing capability. The data store 161 may be embedded in the management function software, or may be separate therefrom, and may be accessible to other management systems.

Figure 20:
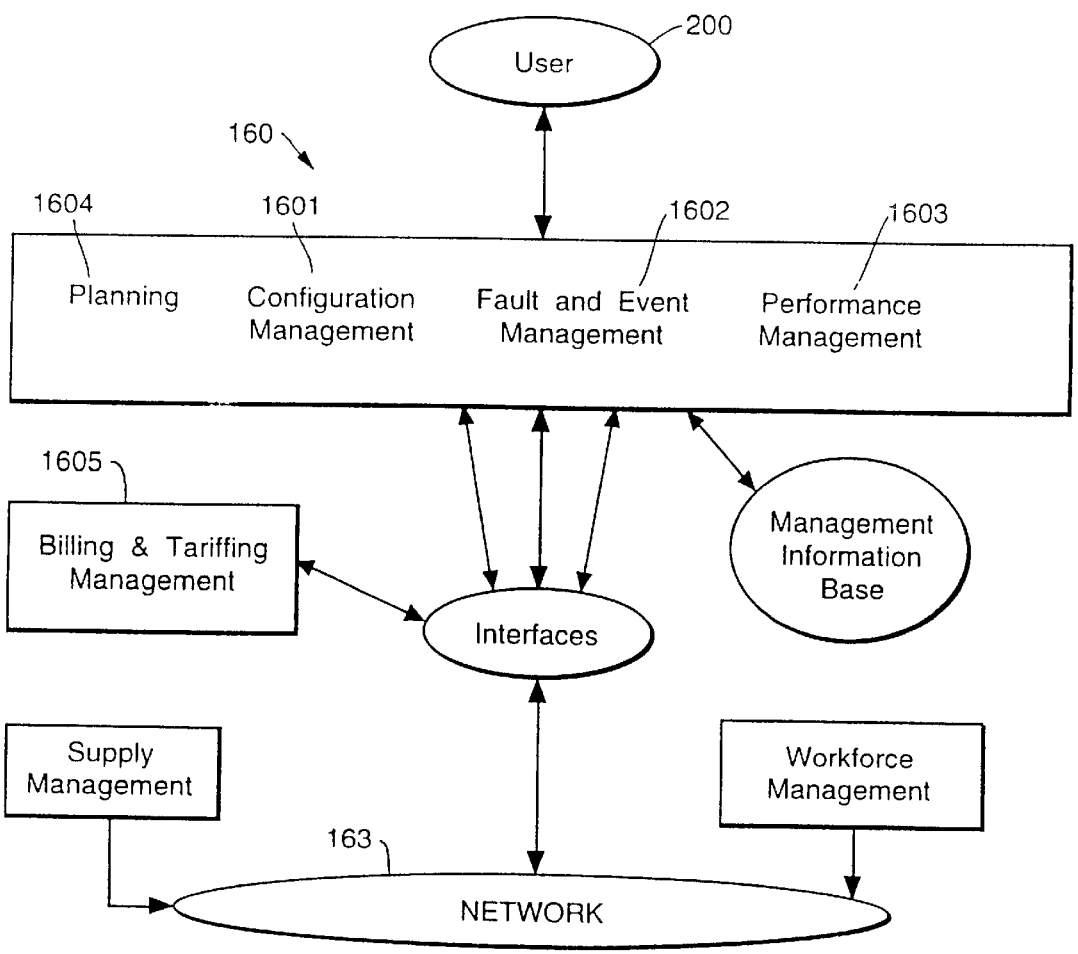
FIG. 20 shows in a block diagram a more detailed representation of hardware and functionality for use in embodiments of the present invention in managing networks than the arrangement of FIG. 16.

Referring to FIG. 20, additional interfaces will generally be provided between:

i) various types of management functionality 160 concerned closely with the network itself, in this case configuration, fault and performance management 1601, 1602 and 1603;
ii) the more business oriented management functionality, such as planning and accounting management 1604, 1605;
iii) the customer terminal 200; and of course
iv) the network itself 163.

In use, the network management functionality receives data from the network (or indeed networks if the network management system is managing more than one network), analyses the data and acts on it by issuing report and control outputs appropriately. Alternatively, it may receive other inputs, such as test requests, in which case it will analyse test information, which it may have already received or which it may have to collect in response to the test request, and again issue a report appropriately.

Important in the operation of the network management (NM) functionality is of course the manner in which it carries out analysis of relevant information in terms of what data inputs it receives, where those data inputs are loaded, how it selects data inputs for analysis and what it uses, particularly as reference values, in analysing the data it locates since these factors will all play a part in determining how the network is then dealt with in terms of monitoring and control by the NM functionality. Germaine to this is the network model built into the NM functionality, or according to which it is constructed.

A scenario in which an embodiment of the present invention can be described is that of the provision of flexible bandwidth services by means of an Asynchronous Transfer Mode network and these will now be described in more detail.

Flexible Bandwidth Service (FBS)

FBS is a network service which provides a customer with an alternative to buying in their own hardware, such as multiplexors and private transmission circuits, in order to build a corporate private network. The customer specifies bandwidth requirements on a point-to-point basis, interfaces and time of day requirements and the network operator provides and manages the equipment and capacity necessary to meet those requirements. The customer is able to monitor their network and request bandwidth changes via an on-site network management terminal. Additionally, billing systems for FBS are designed to give complete flexibility to the customer in that bills can be apportioned within the customer's organisation on a basis which the customer defines, and sent to selected addresses with a regularity that the customer wishes.

FBS is designed to be independent of the physical network used to implement it. It may, for instance, use a core network of multiplexors, fully interconnected with dual 2 Mb/s bearer circuits overlaying a network operator's trunk network. Such a network can be designed to provide flexibility, resilience and economy. As long as the multiplexors conform to international standards, the service can be migrated onto new network technologies as appropriate.

Figure 1:
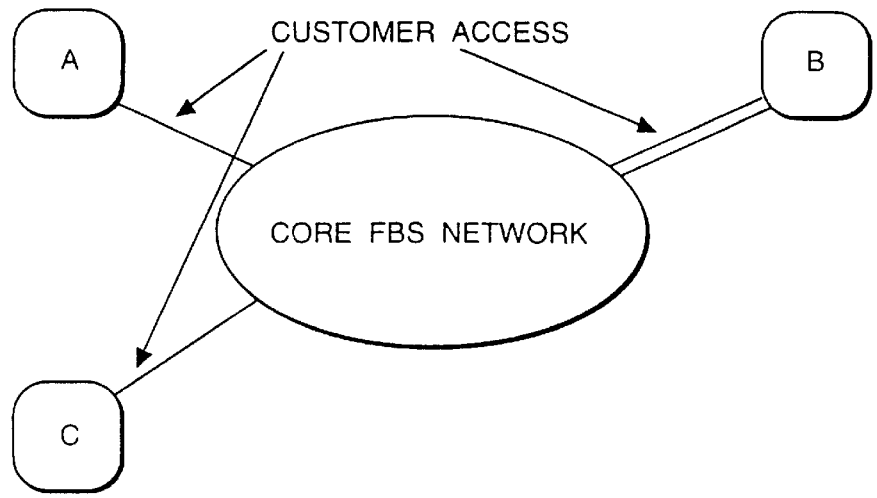
FIG. 1 shows network facilities for an advanced communications service to which the network management system can be applied.

Referring to FIG. 1, a basic structure for an FBS service is shown for a customer with three sites (A, B and C). it might be noted that this particular customer has a site, site B, which requires high resilience access, this being provided by diverse routing between site B and the core FBS network.

In this example, customer access to the network can be achieved in three ways;

High speed access—2 Mb/s local cable links plus a multiplexor on the customer's site.

Medium speed access—2 Mb/s local cable links plus an on-site multiplexor which allows up to ten services to be used simultaneously.

Low speed access—a Kilostream link providing a single service with speeds up to 64 kb/s or, with a multiplexor, allowing 3 to 5 services at rates of 9.6 or 19.2 kb/s.

The multiplexors sited on customer premises are part of the FBS service and are managed by the network operator. Bandwidth is made available to customer routes in a combination of three ways;

"24 hours" bandwidth—speed ranging from 1.2 kb/s to 1920 kb/s available 24 hours per day, 365 days per year. Changes to bandwidth requirements can be made on a monthly basis.

"Scheduled" bandwidth—bandwidth that is switched on and off according to a predefined customer schedule. Changes to the schedule can be made on a monthly basis.

"On demand" bandwidth—used where bandwidth requirements cannot be specified monthly in advance. The customer specifies the connectivity of the required service, but not the times when it is required to be used. The "on demand" bandwidth is requested via telephone, facsimile or the network management terminal. The bandwidth will be made available within 3 hours.

The sum of the "24 hour", "scheduled" and "on demand" bandwidths defines the bandwidth requirements for each site. Using this information, the network operator can dimension the network to meet the quality of service levels that have been agreed with the customers.

ATM Network Technology

ATM is a cell-based transmission technology. It has the ability to carry services with all types of timing and bandwidth requirements, including data, video, speech, facsimile, messaging and multimedia services. The basic physical components are transmission links, multiplexors and switches. The concepts of virtual paths and virtual channels provide a mechanism for abstracting the physical equipment. A physical transmission link may for instance carry two virtual paths, each of the virtual paths carrying three virtual channels. The physical transmission links may be, for instance, synchronous digital hierarchy (SDH) or ATM carried by passive optical network (PON) links. Typical bit rates would be 2.4 Gb/s for transmission and 40 Gb/s for switching.

Due to the wide range of services carried, each with different quality of service (QOS) requirements, and the need to optimise usage of network resources, efficient traffic and QOS management controls are required. At present, the ITU Series of recommendations has identified two types of control, namely connection acceptance control (CAC) and source policing (SP). CAC ensures that new connections are set up only if the network can be expected to carry the extra traffic. SP monitors network input ports to make sure that the traffic entering conforms to the rates that have been agreed with the user. Violations may result in cells being discarded or being accepted with lower priority and/or charged extra to the customer.

ATM specific maintenance issues are related to source policing (SP) and call acceptance control (CAC). The policing function (PF), which carries out SP, is a network element function normally implemented in hardware. If cells are discarded by the PF, it may be desirable to inform the user, via the Service Management Layer (SML), of the resulting service degradation. Since the decision on whether to inform the SML is made by network management, an alarm indication or fault report may need to be issued. The threshold for discarded cells will be service specific as defined in the customer contract. Similarly for CAC, call rejection must be notified to the SML. The allowable rejection rate will be service specific and defined in the customer contract.

Violations of a contract detected by the PF or CAC may be caused by faulty equipment and could initiate maintenance procedures. The management system must decide on the cause of the contract violation (i.e. hardware faults or customer misuse of the contract), and act accordingly.

Figure 2:
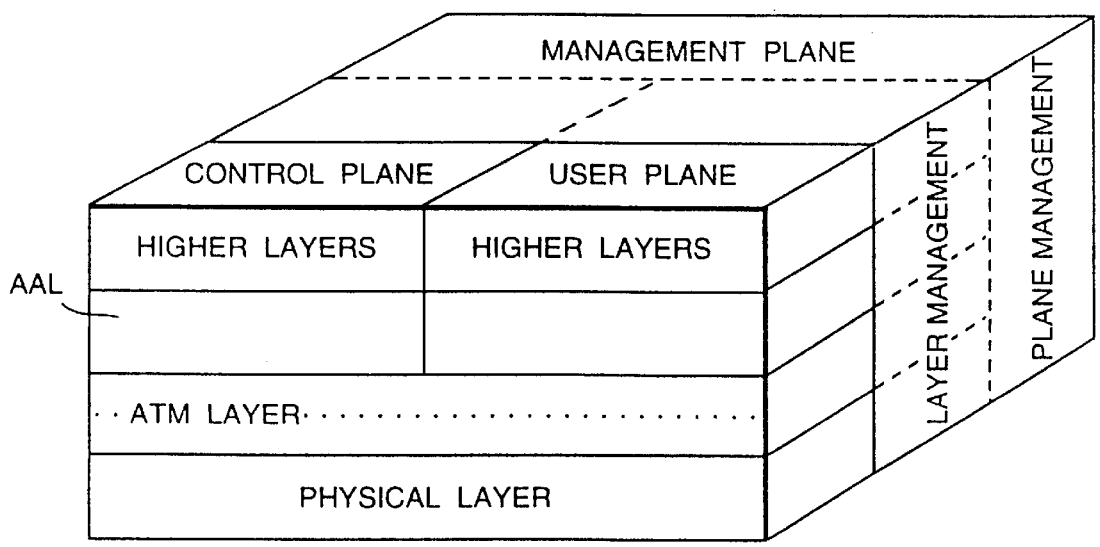
FIG. 2 shows a protocol reference model for broadband services based on ATM technology.

Referring to FIG. 2, a protocol reference model for broadband services based on ATM follows the Open Systems Interconnection (OSI) logical architecture wherein each layer has its own specific functions and offers a defined service to the layer above, using the service provided by the layer below. An ATM adaptation layer (AAL) is positioned between the ATM layer and the higher layers. The customer services exist in the higher layers. The role of the AAL is to enhance the transport service provided by the ATM layer according to the requirements of the specific customer (user) services. That is, it provides a required timing relation between source and destination (synchronous or asynchronous), the bit rate (constant or variable) and the connection mode (connection-oriented or connectionless). The AAL also provides functions for segmenting service data into ATM cell size chunks for transmission over a virtual channel and for reassembling the data at the destination.

The ITU standards body has defined 5 AAL protocol types to accommodate a wide range of user services. AAL 1 is for isochronous, constant bit-rate services, such as audio and video (i.e. circuit emulation). AAL 2 is for isochronous variable bit-rate services, such as compressed video. AAL 3/4 is for variable bit-rate data. This AAL was originally two, one for connection-oriented services (like frame relay) and one for connectionless services (like SMDS). It was then realised that one AAL could cover both situations. AAL 5 is a simplified version of AAL 3/4 which allows the transport of larger blocks of data with improved error detection. Finally, where ATM layer services are sufficient for the user requirements, AAL 0 is used.

In embodiments of the present invention, there is then introduced the "Feature Agreement" (FA) concept.

The FA model provides a consistent approach to supporting the interface between management layers of a network management system. It allows a management layer to provide a particular view of some aspect of its domain in a format which is understandable by an adjacent layer. For example, the network can be viewed by the service management system as a set of network capabilities (commonly called network features) which form the components from which services are built. The network features can be independent of the network technology or equipment vendor.

The basic components of the FA model are the following managed object classes. These classes may be divided into subclasses for specific networks or services.

i) Feature

The class describes in abstract terms a component of technology or functionality being provided at a management interface. At the customer/SML interface, the service supplied to the customer may comprise one or more features (or subclass service feature). Note, a service feature may be a service management capability available to the customer. At the SML/NML interface, the feature will represent network technology or network functionality that supports the service features. These features are network features. One or more standard managed objects can be used to represent a feature if suitable classes already exist.

ii) Profile

A profile describes how a feature is supported in terms of management, such as maintenance, provision or billing, and performance/quality of service requirements. There is no functionality associated with a profile which only contains information.

iii) Feature agreement

A feature agreement associates features with the profiles that are to be applied to them for the particular customer of that agreement. The association is that all the profiles apply to all the features referred to by that feature agreement. Depending on the interface, the customer may be the SML, another network operator, an actual customer or another system or entity using the feature agreement.

It is possible for a feature agreement to support a many-to-many relationship between features and profiles but, in the present embodiment, an all-to-all relationship has been adopted.

iv) Service Customer Contract

A service customer contract is the contract which covers the overall agreement between a network operator and a customer. It is only used at the customer/SML interface. The service customer contract (SCC) will refer to profiles which cover all the services, for example integrated billing requirements.

Figure 3:
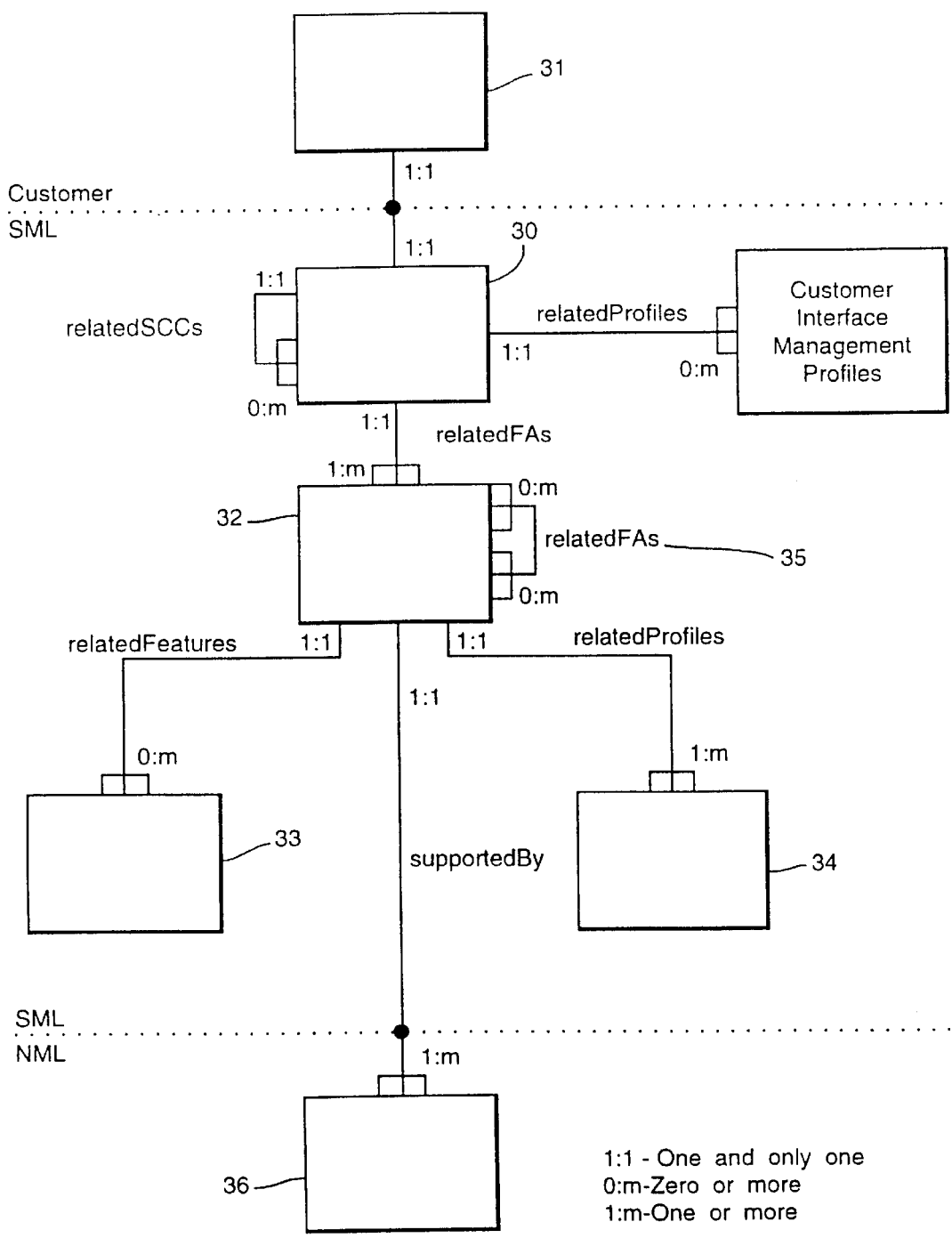
FIG. 3 shows an entity relationship diagram for the customer/service management level interface.

Referring to FIG. 3, a framework for constructing models, in this case at the customer/SML interface, can be expressed as an entity-relationship diagram.

The SCC 30 refers to all the services for a customer 31. The SCC may be composed of a number of sub-contracts Each service is represented by a service FA 32 which is composed of a number of service features 33 and managed according to the profile 34 for that FA. The FAs 32 may be composed of a number of simpler services and therefore a FA 32 can refer to other FAs, via the related FAs relation 35. Where a service feature 33 is supported by a network feature, that service FA 32 can refer to the network FA 36 covering the supporting network feature. Where the same types of profile are referred to by the SCC 30 and FAs 32, the FA profile will take precedence. If possible, this should be avoided.

Figure 4:
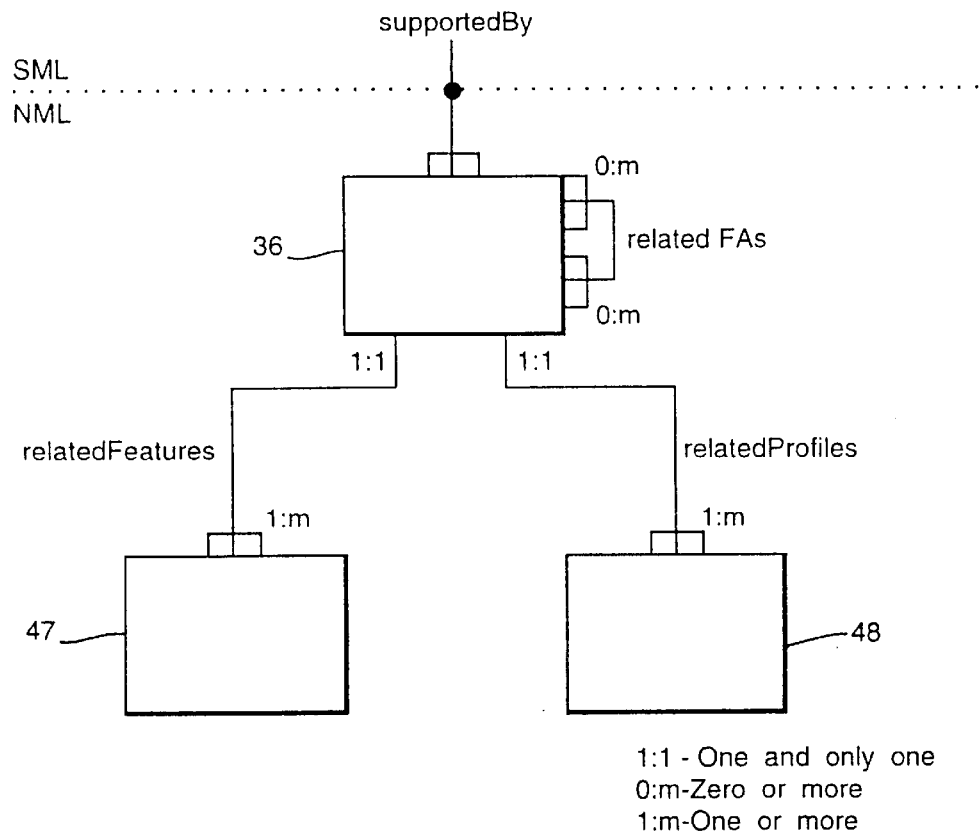
FIG. 4 shows an entity relationship diagram for the service management level/network management level interface.

Referring the FIG. 4, a modelling framework for the SML/NML interface introduces the network features 47 and related profiles 48. Each network FA 36 points to these network features 47 and the relevant profiles 48 define how the features should be managed, or perform. Network features 47 may be composed of simpler network features and therefore the network FAs 36 may refer to other network FAs.

Application of FA Model to Private Circuits

Figure 5:
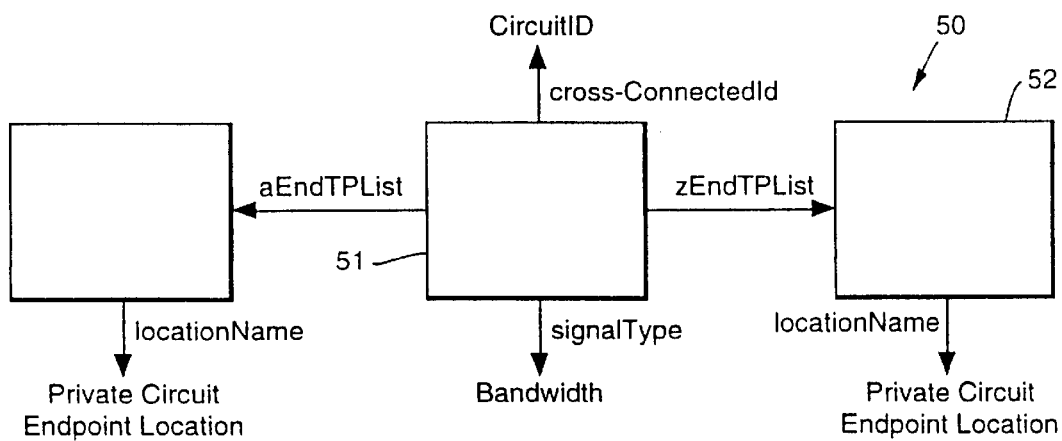
FIG. 5 shows a network feature for a private circuit.

Referring to FIG. 5, the FA model can be applied to private circuits to define the view of the private circuits that a network provides to another management system.

There is one network feature 50 for a private circuit. The feature 50 is composed of classes that exist in the corresponding network operator's Network Model. The classes are the Subnetwork Connection 51 and the Network Level Connection Termination Point 52. FIG. 5 shows how these are used to record the feature information. As shown, the private circuit feature 50 is identified by the ID of the circuit that it represents.

Private circuits will have associated profiles which can be classed appropriately. The following subclasses of a profile class can be used.

Private Circuit Availability Profile

Defines the availability of the private circuit and the conditions under which the availability requirement is broken. Two attributes are defined, availabilityFigure Defines the percentage of time that the circuit must be available.

breakConditions

Defines the alarm types and severities which break the availability requirement.

Private Circuit Maintenance Profile

Defines the maintenance requirements for the private circuit, including when cover is required and response times. The attributes are, maintenanceCover In terms of hours of day, days of week, and any exclusions.

responseTime

The time by which action must be taken once a fault has been confirmed.

window

Defines the times during which maintenance activities may be carried out.

Private Circuit Reporting Profile

Defines what information should be reported, where it should be reported to and under what conditions it is reported. The attributes are, report The information which must reported to each target system.

reportConditions

The conditions under which a report is sent.

Figure 6:
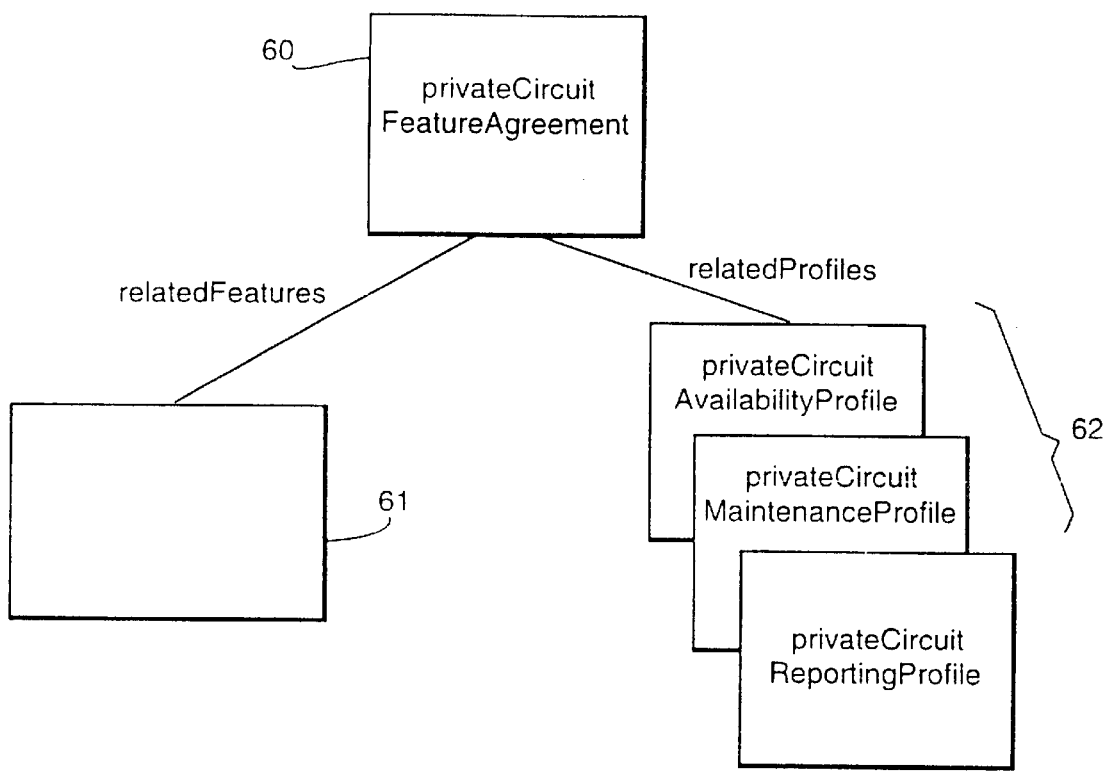
FIG. 6 shows a feature agreement model for private circuits at the service management level/network management level interface.

Referring to FIG. 6, the feature agreement for a private circuit is the privateCircuitFeatureAgreement. The relatedFeatures attribute is restricted to point to instances 61 of the subnetworkConnection class. The relatedProfiles attribute is restricted to point to instances 62 of the three profiles explained above.

The FA model as described above is only being applied to a relatively simple situation. If the FA modelling approach is to be used more widely and for networks and services other than private circuits, then the limitations of the approach need to be understood and any enhancements identified (for example, new types of relationships or attributes which have not been identified yet, or particular constraints on relationships and attributes). The following are issues which need to be considered when modelling more advanced networks and services such as ATM networks and FBS.

Identification of features

There are likely to be many ways in which a complex service such as FBS, or networks such as ATM, can be described and hence alternative features may be possible, within the overall constraint of a feature agreement approach. Ideally, a specific model would be generated automatically from a standard service and network specification.

Reuse of features

As more services and networks are modelled, it is likely that features may be common to more than one service or network. These should be recorded in a format which enables them to be reused in other models. Similar features should be modelled in a similar way and where possible a class hierarchy should be constructed to facilitate reuse.

Related features

For complete management of advanced networks and services, it is likely to be necessary to represent relationships between features at the same management layer. For example, for fault management of networks it is useful to know how one feature affects another feature in order to localise faults to carry out pro-active fault management. Use can be made of the relatedFAs pointer (see FIG. 4) or alternatively a separate relationship object. This information might not however be required to be represented using the FA concept.

Another intra management layer relationship exists due to the fact that service features may combine to form a higher level feature, which in turn may be part of an even higher level feature. To accommodate this structure a hierarchy mechanism is required. These relationships may require attribute extensions to class definitions in the FA model.

Service families

For services which are in fact a family of services, it may be convenient to manage the family as a group.

Services as groups of services

Complex services such as FBS are formed from subservices grouped together to form the whole service. For example, a service might actually comprise a collection of products including network services (calling line identity, network speed calling, time of day routing, etc.), switched data, leased lines and Callstream services. The component services should be modelled so that the customer sees the group of services as a single service.

Customer management functionality

Some services, including FBS, allow the customer some degree of management control over their service. This management facility is part of the service and therefore needs to be represented in the FA model.

Tariffing and billing

Tariffing and billing for services such as FBS is significantly more complicated than traditional leased line services. The facilities are seen as part of the service and must be modelled.

Mapping services and networks together

The relationships between network and services for leased line services are relatively simple to model using the FA concept since the mapping between network and service features is basically one-to-one. For more sophisticated services such as FBS, this mapping is considerably more complicated. A framework for defining and representing the relationship information must be developed that meets all the requirements of the management functions, including message passing (such as broken feature impact reporting and test actions) and event/alarm propagation. The FA model includes relationship objects to support this. The framework developed must be consistent and suitably flexible to cater for all current and future networks and services.

In addition to the mapping of network and service entities, there is also the issue of mapping management information, such as alarms, test results, fault and performance reports, configuration requests, etc, into terms that both management layers can understand. This becomes increasingly difficult as services become more independent from the network supporting them. It is unclear which part of the management system should be responsible for carrying out the mapping.

For fault and test management, the behaviour of networks and services under fault conditions must be understood. A "Broken Features Database" (BFDB) can be used to support fault management at the SML/network control layer (NCL) interface for private circuits, using the FA modelling concept. A broken feature is a feature which is unable to function correctly due to some problem. A BFDB is a store of service affecting broken network features.

The BFDB provides the means of reporting network faults to the SML. When a fault occurs on a private circuit (a Megastream circuit, for example) an alarm is received by an Alarm Collection Unit (ACU) for the circuit. The ACU determines information about the fault (Circuit ID, equipment ID, alarm type, etc) and forwards this information to the BFDB in the form of a Feature Affecting Report (FAR). The BFDB checks to see if the received fault breaks the feature by comparing it with the FA availability profile. If it does break the feature then it checks to see if the feature is already broken. If it is broken, the fault is logged against the break and no further action takes place. If the feature is not already broken then the new break is logged and an Impact Report is sent to the SML. The BFDB can also handle queries from another system, such as an event and test management system (ETMS), regarding the faults currently logged against a broken feature.

If the BFDB is extended to services other than private circuits then the following issues would need to be covered:

Identification of how features can break

For new services and networks it may be difficult to acquire information on how features can break. For services, the criteria will be based on quality of service agreements between the network operator and the customer. However, if the break is due to a network problem it will be necessary to derive how the network failure affects the service feature. Network performance will exist over a wide range of levels and this information must be translated into terms which are meaningful at the service level so that the impact on the service can be determined. The impact of network performance degradation will be service dependent. For example, a loss of a few ATM cells is unlikely to affect a voice service but is unacceptable for a data service which has no error detection and correction facilities.

For new network technologies the way in which their features can break may be difficult to determine because the actual problems that manifest themselves will be based on the reliability of the physical resources. The reliability can only be determined by observation over time.

A network or service feature can also break due to faults or usage problems in other parts of the network. For services unwanted feature interactions are a problem, particularly for advanced network services.

Identification of how broken features affect other features

For diagnosis and pro-active fault management it may be useful to know how the effects of a broken feature propagate within the management layer and across management interfaces.

Automatic or manual detection

It is important for an automatic fault and test management capability to know which features can be detected as broken automatically and which features require manual actions to determine their state.

For automatic detection of broken network features, hardware and/or software for recognising abnormal operating condition(s) is(are) required.

Even if network resources do not have associated automatic fault detection facilities, the management system may still be able to detect unmonitored features by reasoning with the alarms from other parts of the network.

FEATURE AGREEMENT MODELS FOR FBS AND ATM

This section describes FA models for FBS and ATM. Emphasis is placed on those FA classes which are important or specific to the service or network. All classes will have an identity attribute. This attribute is not shown. The following profiles are general and listed here for completeness. It should be noted however this list itself is not complete. Also, in practice, there may be some overlap between the scopes of the profiles.

availabilityProfile
provisionProfile
maintenanceprofile
tariffingProfile
reportingProfile
performanceProfile
pEWProfile (planned engineering works profile)
qOSProfile (quality of service profile)
monitoringProfile
billingProfile

FEATURE AGREEMENT MODEL FOR FBS

The following describes the features, profiles and feature agreements for FBS.

FBS Features
routeFeature

The routeFeature class represents a connection between two customer sites. It has attributes which point to A and B ends of the connection. The attributes are, aEnd Points to the A end nodeFeature of the connection.

bEnd

Points to the B end nodeFeature of the connection.

nodefeature

The nodeFeature class represents a termination point for one or more circuits (routes) at a customer site. Its attributes are, address Address of the customer site. (Alternatively, there could be a class representing a customer site. This could be useful in the cases where there are many nodes at one site. The address of all the nodes on the same site would then point to the site object representing that site.)

location

The physical location of the node within the customer site.

serviceManagementFeature

As part of the FBS service, customers usually have the option of managing certain aspects of the service themselves. The serviceManagementFeature class represents a service management capability available to the customer. There are subclasses for each capability, as follows, status Feature This feature provides a graphical view of the customer's network in terms of the access nodes and routes between them. Colour changes will indicate alarms on routes and trouble ticket details can be viewed. The customer can view textual details of routes and nodes by selecting (eg clicking on) the appropriate graphical object.

serviceChangeFeature

The customer is able to make requests to change the service in some way. The changes include requests for bandwidth (24 Hour, on-demand and scheduled) and for configuration of routes (existing and new). The customer is able to receive regular progress reports.

serviceTestFeature

This feature enables the customer to request parts of the service to be tested and results of the test to be received.

problemReportingFeature

This feature enables the customer to report problems to the network operator.

onLineBillingFeature

Billing information is made available to the customer on-line.

accessProfile

The accessProfile class is associated with the nodeFeature class only. It describes the characteristics required of a node's access to the FBS service and the management actions that should take place if these requirements are not met. The attributes are, resilience
Resilient or normal
speed
Low, medium or High.
bandwidthProfile The bandwidthProfile class is associated with the routeFeature class only. The attributes of the bandwidthProfile class describe the capacity required by the customer for a particular route and the management actions that should take place should these requirements not be met. The attributes are, 24Hour The minimum bandwidth required at any time.
scheduled The bandwidth above the 24 Hour requirement with time and dates for when required.
onDemand The bandwidth required as soon as possible, but within 3 hours, from the time the request is made. Includes the period over which the bandwidth is required.

There will be a relationship between the accessProfiles and the bandwidthprofiles in terms of a constraint on the capacities specified in the bandwidthProfiles. The total capacities specified in the profiles for routes terminating on a particular node must not be greater than that specified in the accessProfile for that node.

serviceManagementProfile

For each of the serviceManagementFeatures there is a corresponding profile which describes how the serviceManagementFeature is managed. The profile will include customer preferences and expected performances (for example, response times following a request).

billingProfile

FBS billing is designed to give total flexibility to the customer. Attributes of the billingProfile are, allocationDetails Defines how the costs are allocated to the customer's business units. Includes name and address of persons to receive the bills.

frequency

Either monthly or quarterly.

dayOfMonth

The day of the month on which the bill is sent.

media

The media by which bills are presented to the customer (disk, magnetic tape, EDI, on-line)

Note that there will be a constraint between the value of the media attribute and the service management features present. That is, there must be an onLineBillingFeature present if the value of the media attribute is 'on-line'.

tariffingProfile

FBS has a flexible tariffing structure covering set-up charges, annual charges and bandwidth charges. The tariffingProfile provides details of the charges. Attributes of the tariffingProlfile are, setupCharges Specifies the charges for setting up links to the core FBS network and for customer interfaces (Service Access Points; SAPs).

annualCharges

Specifies the annual charges for the links to the core FBS network and for customer interfaces (SAPs).

bandwidthCharges

Specifies the rates for each type of bandwidth (i.e 24 Hour, Scheduled and On-Demand) in terms of pence per hour per kilometer.

preProvisioningCharges

Specifies the charges for pre-provisioning links, interfaces and bandwidth.

discountOptions

Specifies the reductions available depending on the length of the contract.

setUpChargeOptions

Specifies how the set-up charge may be spread over the life of the contract.

qOSProfile

Transmission performance is measured on an end-to-end basis. The measurements and targets are specified on the qOSProfile. Attributes of the qOSProfile are, Error Free Seconds (EFS)

The percentage of seconds during transmission tests, excluding out of service periods, in which no bit errors are transmitted. Target>99.5%

Severely Errored Seconds (SES)

The percentage of seconds during transmission in which the bit error rate is greater than $10^{-3}$. Target<0.05%

The round trip delay measured at the SAPs for one bit. Target<24 ms.

availabilityProfile

The availabilityProfile class specifies the percentage time that the service is available to the customer. The figure is for each individual transmission (that is, for each scheduled or on-demand session). Attributes of the availabilityProfile are availabilityFigure For FBS, the availability figure is 99.85% breakConditions

To be determined.

MaintenanceProfile

This profile describes the performance targets for restoring the FBS service after a fault. The attributes cover targets for automatic and manual restoration.

The following attribute covers automatic restoration;

automaticRestorationTime

Where automatic restoration is possible, the target is less than 40 seconds.

The following attributes cover manual restoration;

faultLocationTime

The maximum time for proving and locating a fault is 30 minutes.

engineerOnSite

The engineer must be on site within 2 Hours.

repairTime

The maximum time to carry out the repair is 1 Hour.

FBS Feature Agreements

This section describes the feature agreement subclasses that have been identified for the FBS service. The relationships to the associated feature and profile classes are given.

routeFA

Figure 7:
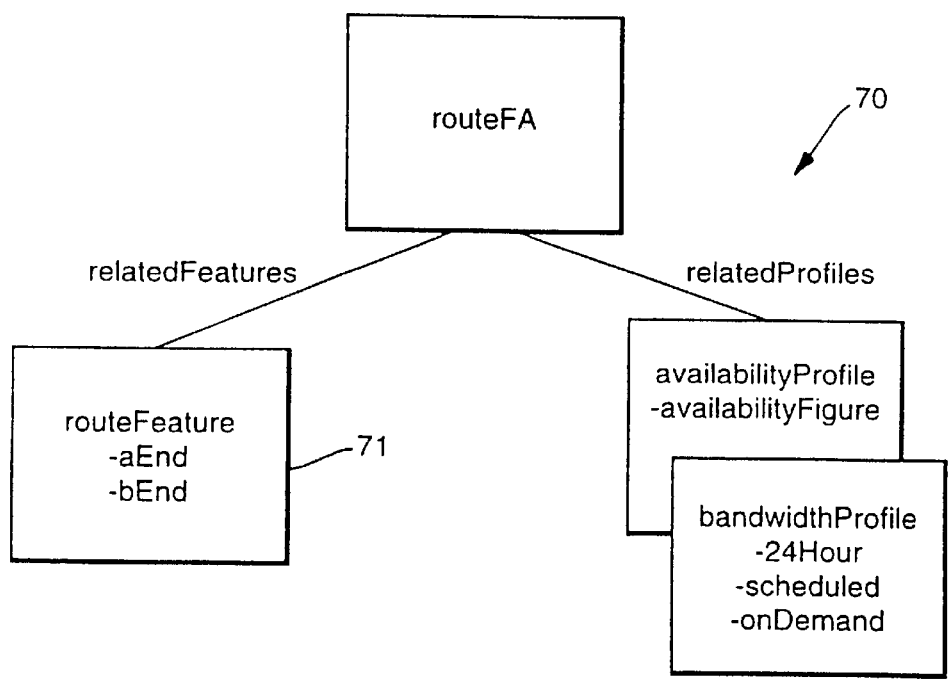
FIG. 7 shows a feature agreement model for a route in a particular service.

FIG. 7 shows the Feature Agreement model 70 for a FBS route.

The aEnd and bEnd attributes of the routeFeature 71 point to the appropriate nodeFeature objects that terminate the route.

nodeFA

Figure 8I:
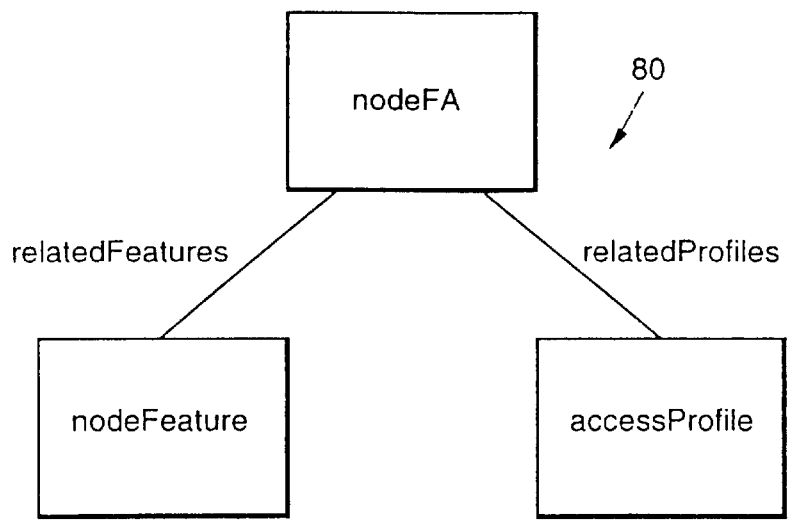
FIG. 8 shows further feature agreement models for classes in the particular service of FIG. 7.
Figure 8I:
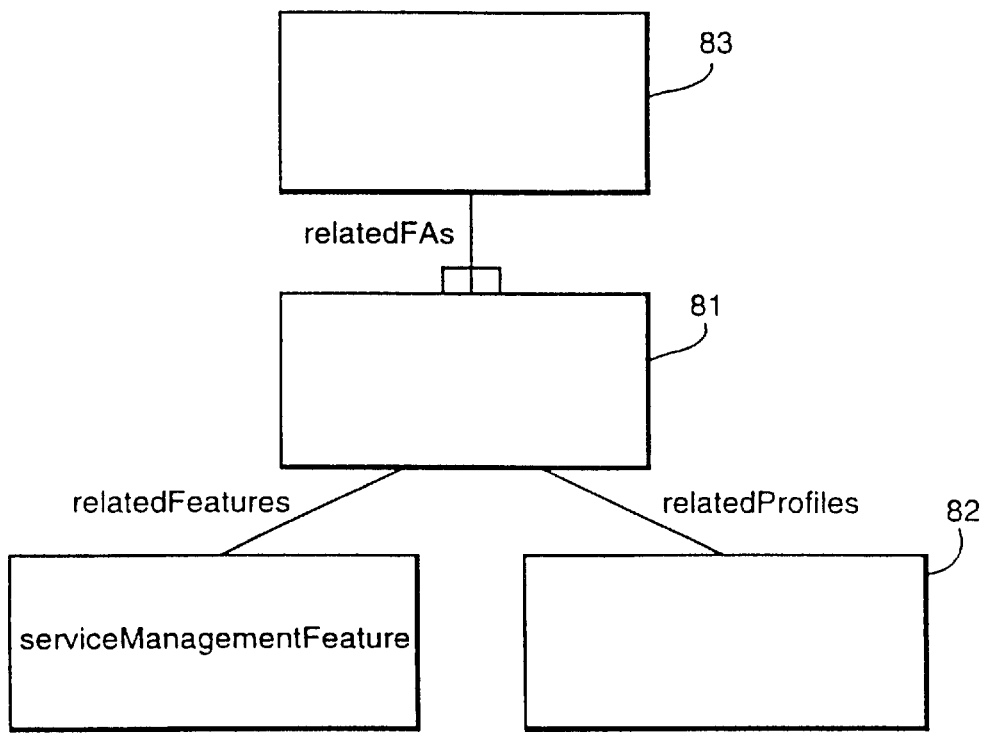

FIG. 8*i* shows the Feature Agreement model 80 for a FBS node.

serviceManagamentFA

Referring to FIG. 8*ii*, the serviceManagementFA class 81 associates the serviceManagementFeature classes with the appropriate serviceManagementProfile 82. There are subclasses for each of the types of service management capabilities.

customerManagementFA

FIG. 8*ii* illustrates the classes and relationships for the customerManagementFA class 83. This class represents the total service management capability available to the particular customer.

fBSFA

FIG. 8iii shows the model for the FBS service. The FBS service can be represented as a collection of routes, nodes and customer management capability. The fBSFA class 84 represents the FBS service. The relatedFAs attribute points to the feature agreements 85, 86 representing the routes and nodes composing the FBS service. The number of routes and nodes will be customer dependent. The fBSFA class 84 will have profiles 87 associated with it which apply to the service as a whole, for example, a billing profile. Each routeFA 85 or nodeFA 86 will have profiles specific to themselves.

An example of a particular FBS service will be given below, under the heading "A Complete Modelling Example".

FEATURE AGREEMENT MODEL FOR ATM

The key characteristics of an ATM network are to do with virtual paths, virtual channels and adaptation. The following section describes the features, profiles and feature agreements that have been identified for ATM network technology.

ATM Features vPTrail

The vPTrail represents a permanent or semi-permanent unidirectional route across the network such as a bearer circuit. It corresponds to an ATM virtual path (VP). It is a subclass of the generic trail managed object class defined in the BT Network Model. The attributes are, a-TP Points to the a end termination point of the VP.

z-TP

Points to the z end termination point of the VP.

vCTrail

The vCTrail represents an on-demand or semi-permanent unidirectional route across the network, such as an individual call. It corresponds to an ATM virtual channel (VC). It is a subclass of the generic trail managed object class defined in the BT Network Model. The attributes are, a-TP Points to the a end termination point of the VC.

z-TP

Points to the z end termination point of the VC.

sAPFeature

FIG. 9 shows the sAPFeature Class Hierarchy. The sAPFeature class represents the point in the network to which access to the service is provided (i.e. the service access point (SAP)). The SAP provides the appropriate adaptation for the specific service. It has one attribute, subordinate Of This attribute identifies the customer premises equipment of which the SAP is a part.

The SAP will have a related aALProfile which defines the appropriate adaptation required. There are subclasses for unidirectional and bidirectional SAPs 90, 91, 92.

Referring to FIG. 9, there are two unidirectional SAPs, one for the transmit direction (sAPTxFeature) 90 and one for the receive direction (sAPRxFeature) 91. The bidirectional SAP (sAPBidFeature) 92 is a subclass of both the unidirectional SAP classes.

aTMSignallingFeature

The aTMSignallingFeature represents the signalling functionality provided by the network for controlling switched connections.

ATM Profiles

This section describes the profiles that have been identified for the ATM network technology.

adaptationProfile

This profile class encompasses the adaptation requirements on the ATM network in order to successfully carry services over the network. The profile defines the management actions to be taken if the requirements are not met. The attributes define the characteristics of the service. The attributes are, Timing Some services require a timing relation between source and destination, other services do not.

sit Rate

Some services have a constant bit rate, others have a variable bit rate

Mode

Services can be connection oriented or Connectionless.

There are subclasses for each of the AAL types. (i.e. AAL0, AAL1, AAL2, AAL3/4 and AAL5), as follows, aAL1Profile Timing Required Bit rate Constant Mode Connection oriented aAL2Profile Timing Required Bit Rate Variable Mode Connection oriented aAL3/4Profile Timing Not required Bit rate Variable Mode Connectionless (or connection oriented)

aAL5Profile

Timing

Not required

Bit rate

Variable

Mode

Connection oriented aAL0Profile

This adaptation profile is used when no adaptation is required. That is, when the service provides pure ATM cells to the network. The attributes values will be NULL.

Timing

NULL

Bit rate

NULL

Mode

NULL accessProfile

This profile specifies any access requirements on a service access feature agreement. Attributes are, Resilience Diverse or single access routing.

Capacity

The maximum bandwidth available.

bandwidthProfile

The bandwidthProfile class describes the bandwidth characteristics of the data being supplied by the service and the management actions to be taken if these requirements are not met. The attributes are, Peak This is the peak bandwidth required by the service.

Mean

This is the average bandwidth required by the service.

Burstiness

This is a measure of how quickly the bandwidth requirement changes (i.e. how 'bursty' the data is).

performanceProfile

The performanceProfile class describes how the performance of a network feature is measured and the standard required. The management actions which occur if the performance standards are breached are included. There are subclasses for the different parts of the ATM network. The actual performance of the feature at any time will be logged elsewhere by the performance management system and possibly referred to by the profile. The performance profile subclasses follow.

aTMLayerPerformanceProfile

Describes the performance of the virtual paths and virtual channels in terms of, Bit error rate Cell insertion rate Cell loss ratio This profile will be associated with the vCTrail and vPTrail features.

aALPerformanceProfile

Describes the performance of the adaptation layer in terms of,

Cell error ratio

Cell insertion rate

Short term bit error rate

Severely errored cells

Cell transfer delay

Cell delay variation

This profile will be associated with the sAPFeature class.

networkPerformanceProfile

Describes the overall performance of the network in terms of

Information error

Information loss

Mean information transfer delay

Information delay variation

This profile contains the rules for transforming the performance of the sAPFeatures and the vCTrail/vPTrail features into the generic network performance terms. The performance management system can then use this information to calculate when performance thresholds have been exceeded.

ATM Feature Agreements

This section describes how the ATM features and profiles described above can be combined using feature agreements to form useful network offerings.

connectivityBidSymFA

Figure 10I:
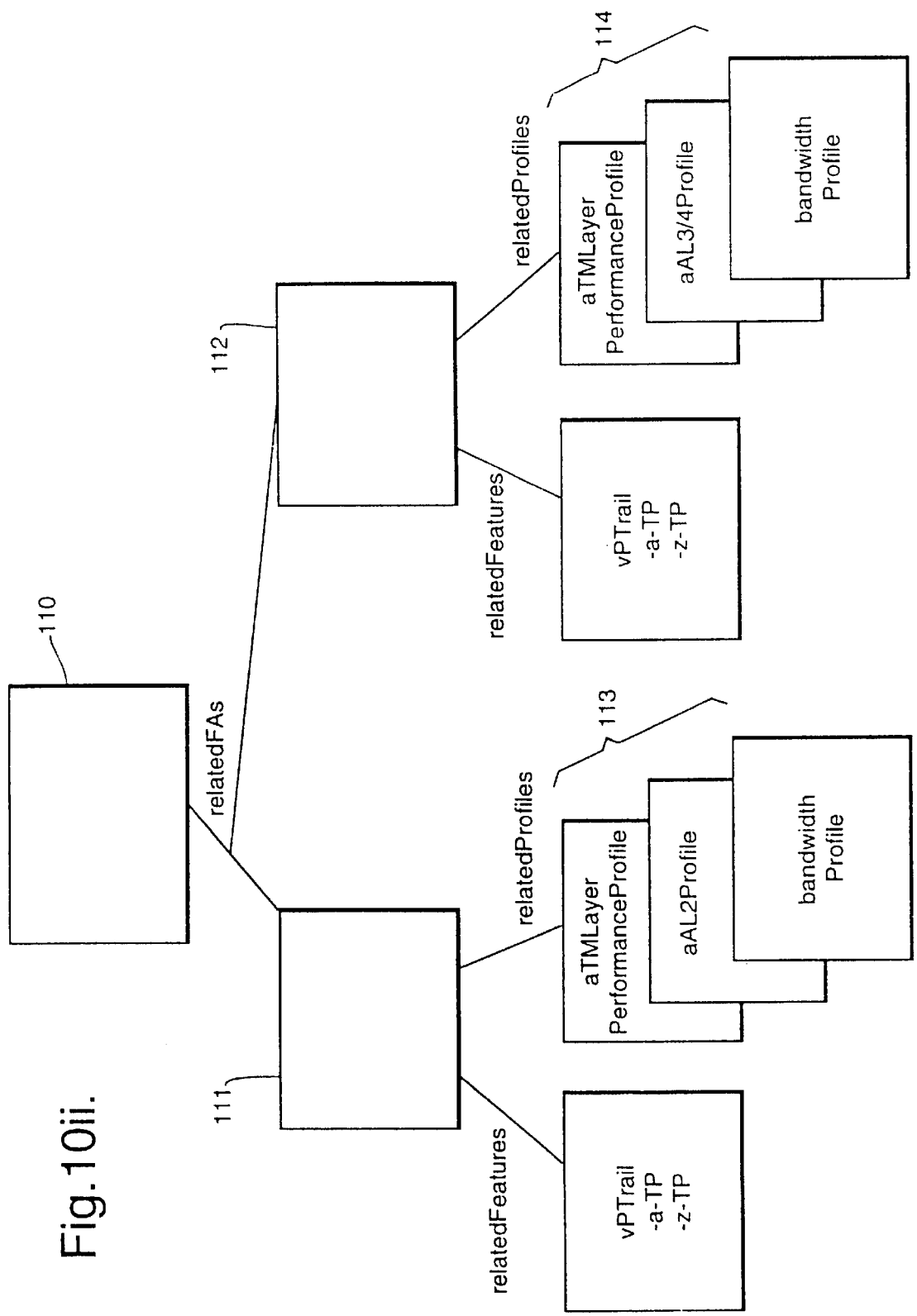
FIG. 10 shows examples of classes applicable to feature agreements for the combination of features and profiles to form useful network offerings on an ATM network.

FIG. 10*i* shows the connectivityBidSymFA class. This feature agreement 100 combines two vPTrail instances to form a permanent (or semi-permanent) connection between two points (similar to a Megastream circuit). Note that the service access points are not included because this FA is intended to represent connectivity only. The circuit is bidirectional and symmetric. All the profiles 101 cover ail the features 102.

The aAL1Profile has been used since AAL1 is the 'circuit emulation' type of adaptation. The performance profile is the aTMLayerPerformanceProfile class.

connectivityBidAsymFA

FIG. 10*ii* shows the connectivityBidAsymFA class. This Feature Agreement 110 is used where different data characteristics are required in each direction. FIG. 10*ii* shows the classes and their relationships that could be used for a Video-On-Demand service.

The connectivityBidAsymFA class consists of two unidirectional connectivity feature agreements 111, 112 (i.e. of class connectivityUniFA), one for each direction. Each connectivityUniFA instance will have its own profiles 113, 114, 115 matching the requirements for the data being sent over it.

In FIG. 10*ii*, the connectivityUniFA 111 on the left would be for the video data (high bandwidth, variable bit rate, timing required) and the endToEndConnectivityUniFA 112 on the right would be for user commands (low bandwidth, no timing required).

sAPFA

FIG. 10*iii* shows the sAPFA, a feature agreement 116 which provides the service access capability. There are subclasses 117, 118, 119 for transmit, receive and bidirectional access points. Each sAPFeature will have an associated aALProfile 115.

There are two subclasses for unidirectional SAP FAs. The sAPTxFA 103 is for a unidirectional SAP in the transmit direction and has a related sAPTxFeature 117. Similarly for a unidirectional SAP in the receive direction there is the sAPRxFA 104 which has a related sAPRxFeature 118. The sAPBidFA 119 is a subclass of both the unidirectional SAP classes. The sAPBidSymFA 105 inherits the features from both. This means that it will be composed of a sAPTxFeature 117 and a sAPRxFeature 118 with a common set of profiles. The sAPBidAsymFA 106 inherits the transmit and receive feature agreements. For clarity the inherited classes are repeated (dotted outline) in the figure.

sAFA

Referring to FIG. 10*iv*, this feature agreement 107 aggregates a collection of sAPFAs 116 to create a service access feature. Each sAPFA 116 would be associated with the same physical equipment. The sAFA 107 supports a service node-Feature. The number of sAPFAs 11 6 aggregated will depend upon the particular service.

endToEndConnectivityFA

Figure 10V:
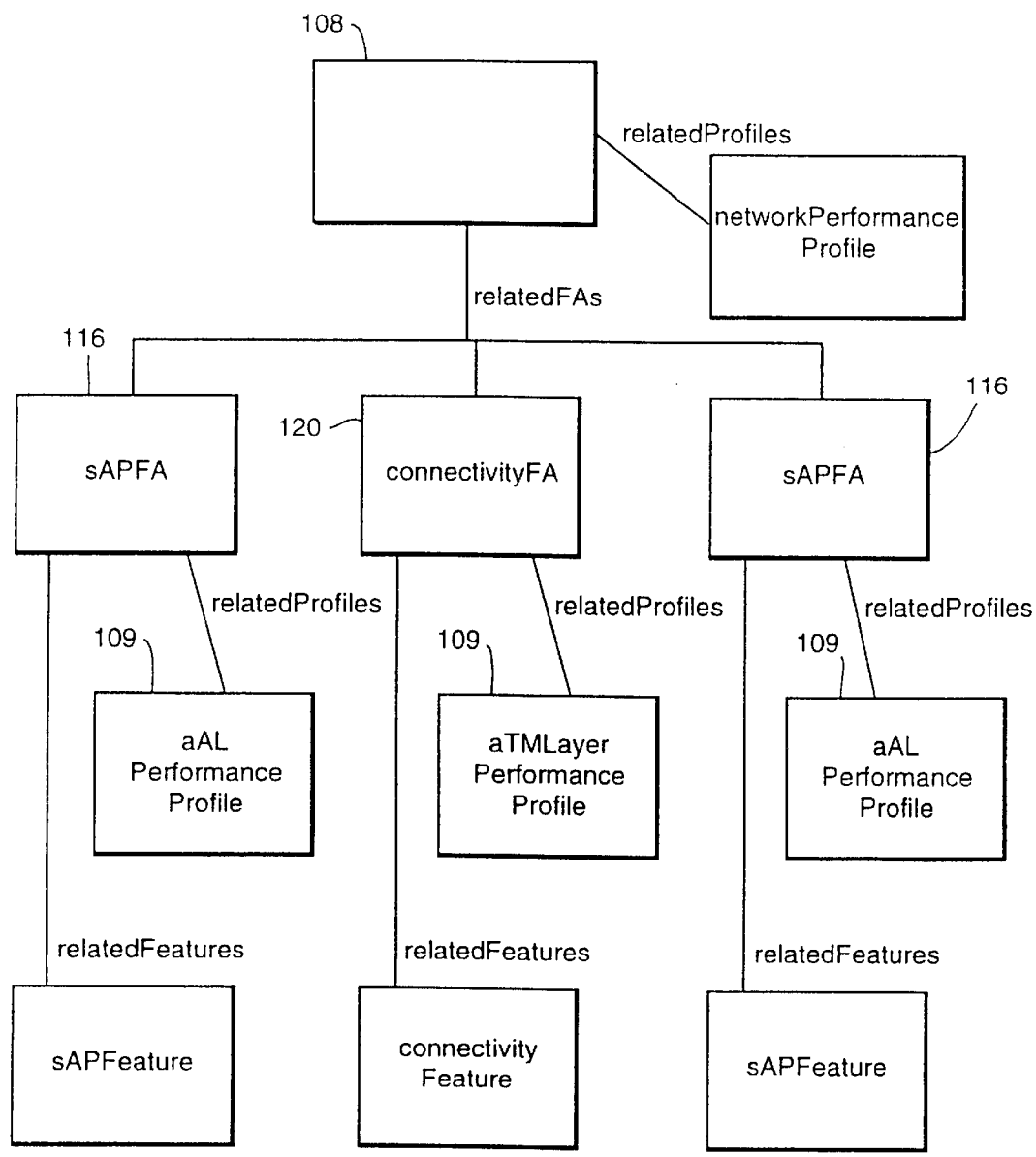

Referring to FIG. 10*v*, the endToEndConnectivityFA classes 108 package together the network features required to support a complete end-to-end communication capability. The class includes the service access points 116 and the connection between them.

The performanceProfile classes 109 are shown to illustrate how they are related for the purposes of defining the overall network performance of the end to end connection.

Subclasses of endToEndConnectivityFA 108 would be defined for unidirectional and bidirectional end to end connections. These subclasses would consist of the appropriate subclasses of sAPFA 116 and connectivityFA 120.

MAPPING BETWEEN FBS FEATURES AND ATM FEATURES

This section gives some examples of mapping FBS features onto ATM features and illustrates two possible approaches to mapping where the relationship is not one-to-one.

FIG. 11*i* shows how one route of a FBS could be mapped onto an ATM network. An endToEndConnectivityBidSymFA 121 is used to support a routeFA 122. In this case, there is a simple one to one mapping.

In the case of multiple network feature agreements supporting a single service feature agreement, two approaches for mapping have been identified. Consider a diversely routed FBS connection.

Approach 1

Referring to FIG. 11*ii*, a new network FA, the diverselyRoutedEndToEndConnectivityBidSymFA 123, is defined which aggregates two endToEndConnectivityBidSymFAs 121.

Referring to FIG. 11*iii,* in a second approach, a relationship object 1 24 is used to define the relationship between the service and network FAs.

The relationship object 124 would define how the network feature agreements 125 combine to support the service feature agreement 126 and how management information would be passed in both directions across the SML/NML interface. A relationship class has been proposed within the Feature Agreement concept for this purpose.

In both approaches, a mechanism is required for capturing behaviour rules defining the relationships between the network features and the service features. A generic rule-based language for addressing this issue is discussed further on.

For the work described in the remainder of this document, approach 1 has been adopted.

A COMPLETE MODELLING EXAMPLE

Referring to FIG. 12, consider a customer with sites 127 in Ipswich, Belfast and Edinburgh, with the following interconnection requirements, Private Circuit from Ipswich to Belfast
64 kb/s 24 hours for voice.
Private Circuit from Ipswich to Edinburgh
2 Mb/s 24 hours for data.

An additional requirement is that the node at Ipswich must have a high resilience. No customer management capability is required.

These requirements can be satisfied by providing a Flexible Bandwidth Service. FIG. 12 shows how this service could be represented graphically at the customer/SML interface.

Figure 13I:
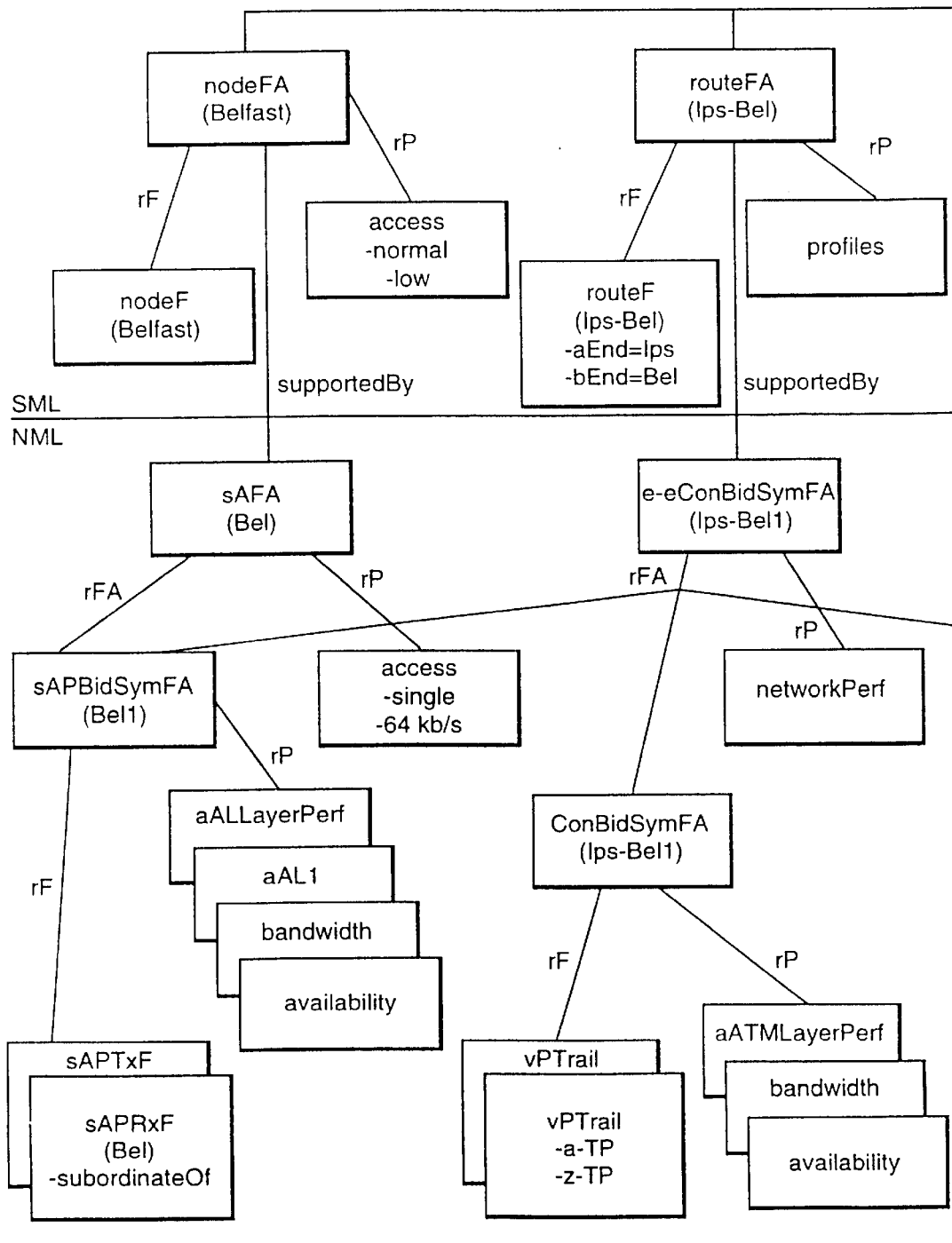
FIG. 13 shows a feature agreement model for a simple service with its mapping on to an ATM network.
Figure 13I:
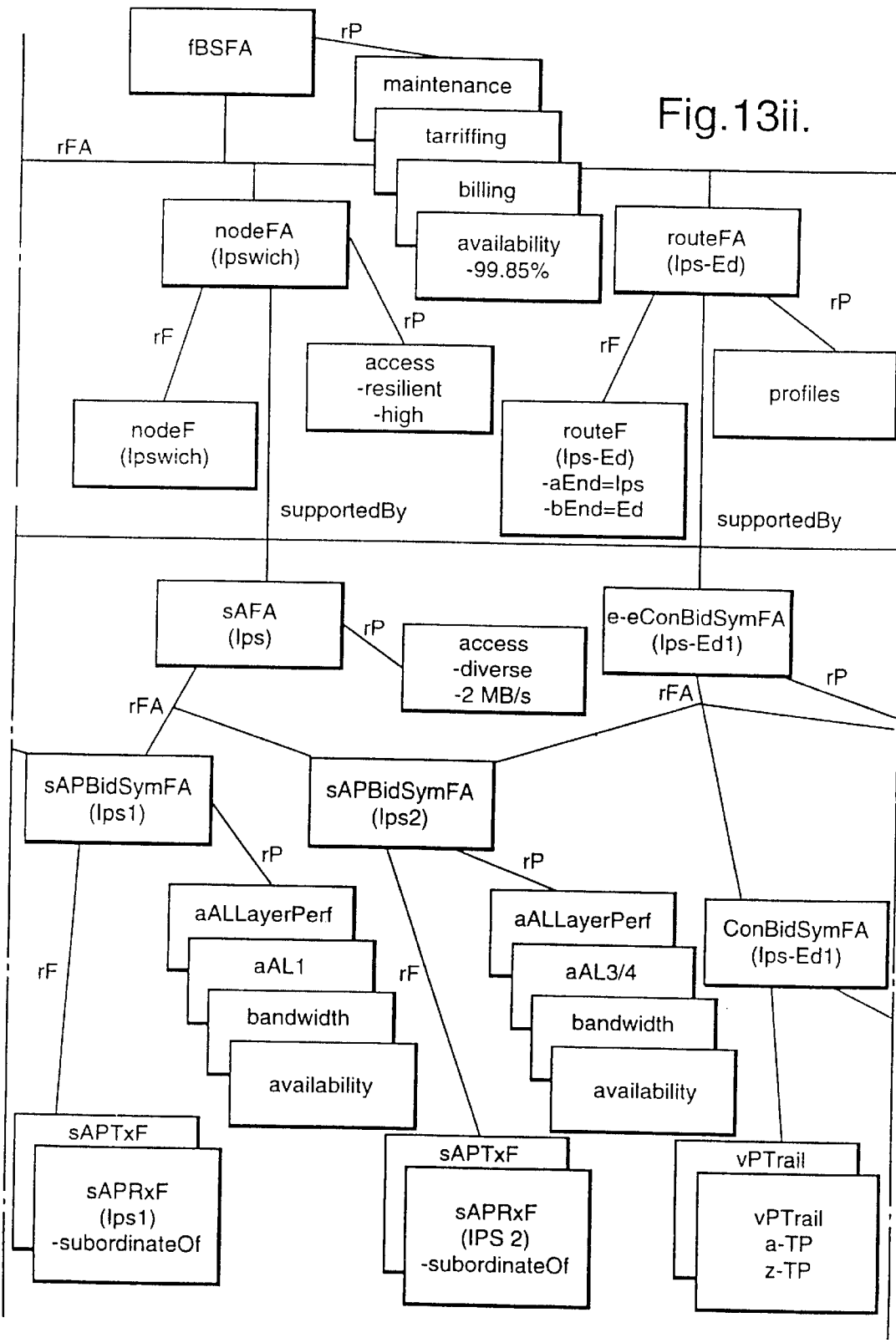

FIG. 13 shows how the FBS service is modelled and how it can be implemented on an ATM network. Points to note are, Not all profiles are included for every FA.

Each nodeFA is supported by a sAFA which aggregates the sAPFeatures on that node.

Each routeFA is supported by an end to end connectivity FA which, by definition, includes the SAPs. This means that the SAP Features are contained in more than one FA (these are the sAFA and the connectivity FA which it terminates).

An access profile exists at both the service level and the network level. The attributes are in different terminology but cover the same requirements. Resilience at the service level is implemented in the network by diversely routing the access part of the route. High speed at the service level is implemented by providing a capacity of 2 MB/s on that node.

Routes at the service level do not include the nodes at their ends although they do have pointers to them (via the aEnd and bEnd attributes, see "FBS Features" above). The supporting network connectivity FAs include end points (i.e. sAPFeatures). This illustrates that the network model does not have to reflect the structure of the service model. Both models can be developed independently to meet the requirements of the different management systems.

The adaptation profile chosen by the network for the voice circuit is of type 1. For the data circuit, type 3/4 has been chosen.

Broken Features

This section describes how FBS and ATM features can 'break'. A feature is said to be broken if it is not functioning correctly such that the service which it supports is affected detrimentally. There are in general two ways in which a feature can break. A feature will be broken if it is unavailable, that is if the customer is unable use it. The second way is if the customer is able to use the feature but only with a degraded performance. Degraded performance is a softer form of break which will require maintenance but may not count against the availability figure for the service. The performance/QOS profiles will include the thresholds over which the feature is deemed to be broken. Severely degraded performance may count against the availability figure and, if so, these conditions will be defined in the availability profile.

ATM broken features are due to faults in the physical switching and transmission systems of the ATM network. The main symptoms that occur due to these faults are, loss of synchronisation, corruption of data and loss of signal. These problems contribute to the degradation of the different performance parameters defined in the performance profiles. There will be thresholds above which the feature will be defined to be broken. The actual thresholds will be service and customer dependent.

Table 1 summarises how each ATM network feature can break, which other features are affected (these may be other ATM features and/or FBS features) and how these features are affected. Only the high level classes are addressed since the subclasses will have the same behaviour.

TABLE 1

Broken Features and Their Effects

| Network Feature | How it Breaks | Affected Service (and/or network) Features | How Affected |
|---|---|---|---|
| vPTrail vCTrail | Unavailable | supported routeFeature | Unavailable for transmission in direction of Trail |
| | Degraded Performance | supported routeFeature | Degraded Transmission[1] in direction of Trail |
| sAFeature | Unavailable | nodeFeature | Degraded Performance |
| | | associated vCTrail associated vPTrail far end sAPFeature | Loss of input signal Loss of far end signal |
| | Degraded Performance | nodeFeature | Degraded Performance |
| | | associated vCTrail associated vPTrail far end sAPFeature | Degraded input signal Degradation of far end signal |

Notes
[1]The impact on the routeFeature will depend upon the severity of the degradation and the service use of the routeFeature (i.e. voice, video, data etc).

The breaks and effects are in terms of the types of alarms that would be reported on that feature. A broken feature may or may not result in a break of an affected related feature. For example, if an ATM sAPFeature became unavailable then the nodeFeature which it supports would suffer a degraded performance. (If all the sAPFeatures on that node became unavailable the nodeFeature would be unavailable). The Trail (VC or VP) which the broken sAPFeature terminates would be affected since no transmission could occur over it. This would be indicated by a 'loss of input signal' alarm. Additionally, the sAPFeature at the other end of the Trail would also register the failure via a 'loss of far end signal' alarm.

Broken Feature Agreements

A feature agreement will be broken if any required performance targets, as defined in the profiles for that feature agreement, are not met. Note that, for certain types of performance, such as network performance and QOS, broken targets will imply that the feature for that feature agreement is broken, while for other types of performance, such as maintenance and provisioning, broken thresholds will imply that there are problems with the management functions responsible for meeting the targets in the profile. Broken feature agreements are potentially serious because they may result in some form of compensation being made to the customer.

In the case of FBS, the fBSFA feature agreement will be broken if the availability figure is not achieved, that is, if it is not available for at least 99.85% or more during any scheduled, on-demand or 24 Hour session. (There should be a Service Credit Scheme in operation for compensating the customer when the availability is not achieved.)

A route feature agreement will be broken if its QOS targets are not met, that is, if there are errored seconds for more than 0.5% of a session, if there are severely errored seconds for more than 0.05% of the time or if the round trip delay is greater than or equal to 24 ms.

A Framework For a Mapping Language

A generic language is required for specifying the behavioural relationships between objects in feature agreement models. The language must support the passage of information across the management layer interfaces, for example, for the purposes of broken feature management, performance monitoring and testing. The specification of behavioural relationships, defined using the mapping language, will exist in profiles of the model. Referring briefly to FIG. 16, an interpreter for applying the language might be built into either the management functions or the management information.

The following concentrates on broken feature management.

Faults occurring in the network will result in alarms being reported on the affected network features. The availability profile for that feature will contain the conditions under which the feature is deemed to be broken. If the feature is broken, the reporting profile will define which entities need to be notified that the feature is unavailable (that is, its capability is unavailable). The notified entities will include the service FA that the network FA supports or a superior FA (i.e. the FA of which the reporting FA is a subpart). An unavailability message will be passed on from these notified FAs according to the conditions in their availability and reporting profiles.

For a network FA at the SML/NML interface, the break conditions will define when the break is service affecting and when the FA itself has been broken (for example, if the availability figure has been exceeded). In the case of a service affecting message being sent from the network FA to the affected feature agreement, the break conditions for the affected service feature will determine the impact on the service feature (that is, whether the feature is broken or just that the performance is affected).

The general rules of the language for broken features are given below. (The symbol "←" means "implied by".)

(The following constraint is applied in the modelling: a FA may only have relatedFeatures or relatedFAs, NOT both)

BrokenFeature(FA)←breakConditions(relatedFeatures [FA])=TRUE

This rule says that the feature(s) covered by the FA are broken if any of the break conditions for the feature(s) are true.

BrokenFeature(FA)←breakConditions(relatedFAs[FA])= TRUE Where the rules for the break conditions of the FA are written in terms of BrokenFeature(FA). This enforces a recursive definition which terminates at the feature level.

The above rules are applicable to both service and network levels. In addition, for a service FA which is supported by a network FA, we have, BrokenFeature(service FA)←breakConditions (supportedBy[service FA])=TRUE This rule says that the feature of a service FA that is supported by a network FA will be broken if the break conditions for the service feature are true. The conditions will be in terms of BrokenFeature(FA) where FA is the supporting network FA. This rule overrides the first two rules for service FAs which have a supportedBy relationship.

The following rule captures the concept of a broken feature agreement.

BrokenFA(FA)←targetBreakConditions(FA)=TRUE

This rule says that a feature agreement is broken if any of the contracted performance targets are not met. It may only be necessary to check for broken FAs at a management interface because the FA at the interface represents the actual agreement. The sub-FAs exist only for modelling convenience.

The mapping language must allow for feature break and target break conditions to be specified in terms of the states of component features and feature agreements. The language must also enable the resulting actions initiated when the conditions are true to be specified.

Figure 14:
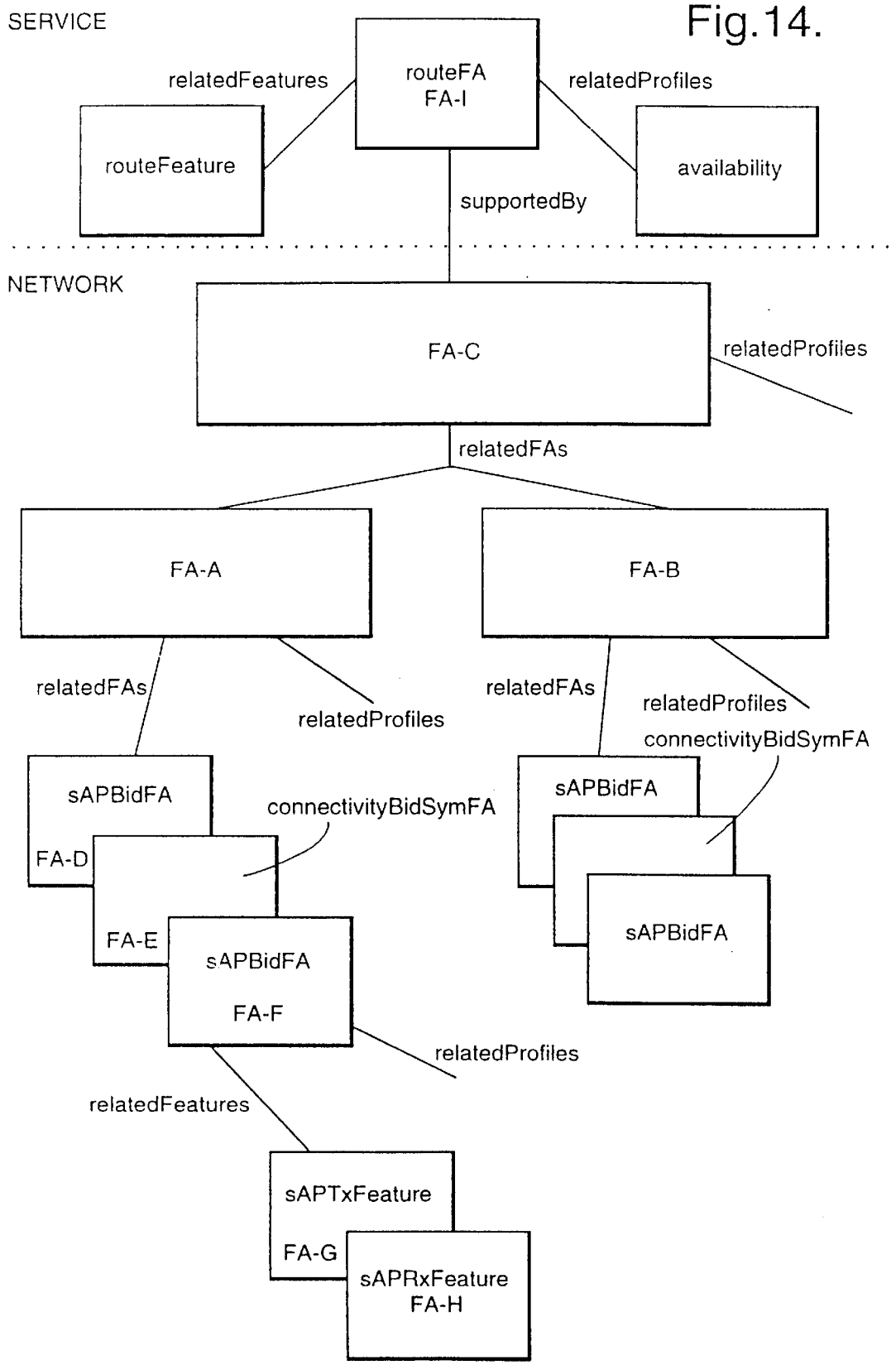
FIG. 14 shows the partial model of a diversely routed circuit of FIG. 11*ii*, but in more detail.

The above rules are generic and specific instances defining the actual break conditions will be used in the particular application. Consider the earlier diversely routed connection example (repeated with more detail in FIG. 14).

The routeFA is supported by a diversely routed connectivity FA-C (i.e. feature agreement C) which consists of a main connectivity FA-A, and a stand-by connectivity FA-B.

The rule defining the break condition for FA-C would be,

BrokenFeature(C)←BrokenFeature(A) AND BrokenFeature(B)

That is, for the features of FA-C to be broken requires the features of both FA-A and FA-B to be broken at the same time.

For FA-A,

BrokenFeature(A)←BrokenFeature(D) OR BrokenFeature(E) OR BrokenFeature(F)

That is, the features of FA-A will be broken if one or more of the features of FA-D, E or F are broken (i.e. either of the access points or the connection between them).

Using FA-F as an example for one of the components of A,

BrokenFeature(F)←Unavailable(G) OR Unavailable(H)

That is, the SAP-F will be broken if either the transmit or receive SAPs are unavailable.

At the service level, the break condition rule for the route I is,

BrokenFeature(l)←BrokenFeature(C)

That is, the route feature will be broken if the feature of the supporting connectivity network FA-C is broken.

The above rules assume that a feature is either broken or not broken. This is a simplified situation, and in general, the rules could be specific to the type of break and the severity of the break.

Discussion

In the above, FA models have been specified for FBS and ATM in terms of the feature, profile and feature agreement classes that are needed to capture the pertinent information required for their management. These classes form the beginnings of a catalogue of reusable objects for modelling networks and services. A more detailed specification of the classes would of course still be required before they can become registered in a catalogue. Also, a suitable cataloguing mechanism should be identified.

MANAGEMENT FUNCTIONALITY DESCRIPTION

Faults occurring in the network will result in alarms being reported on the affected network features. The availability profile for that feature will contain the conditions under which the feature is deemed to be broken. If the feature is broken, the FA for that feature will indicate to the entities defined in the reporting profile that it is unavailable (that is, its capability is unavailable). The notified entities will include the service FA that the network FA supports or a superior FA (ie the FA of which the reporting FA is a subpart). An unavailability message will be passed on from these notified FAs according to the conditions in their availability and reporting profiles.

For a network FA at the SML/NML interface, the break conditions will define when the break is service affecting and when the FA itself has been broken (for example, if the availability figure has been exceeded). In the case of a service affecting message being sent from the network FA to the affected feature agreement, the break conditions for the affected service feature will determine the impact on the service feature (that is, whether the feature is broken or just that the performance is affected).

Figure 15:
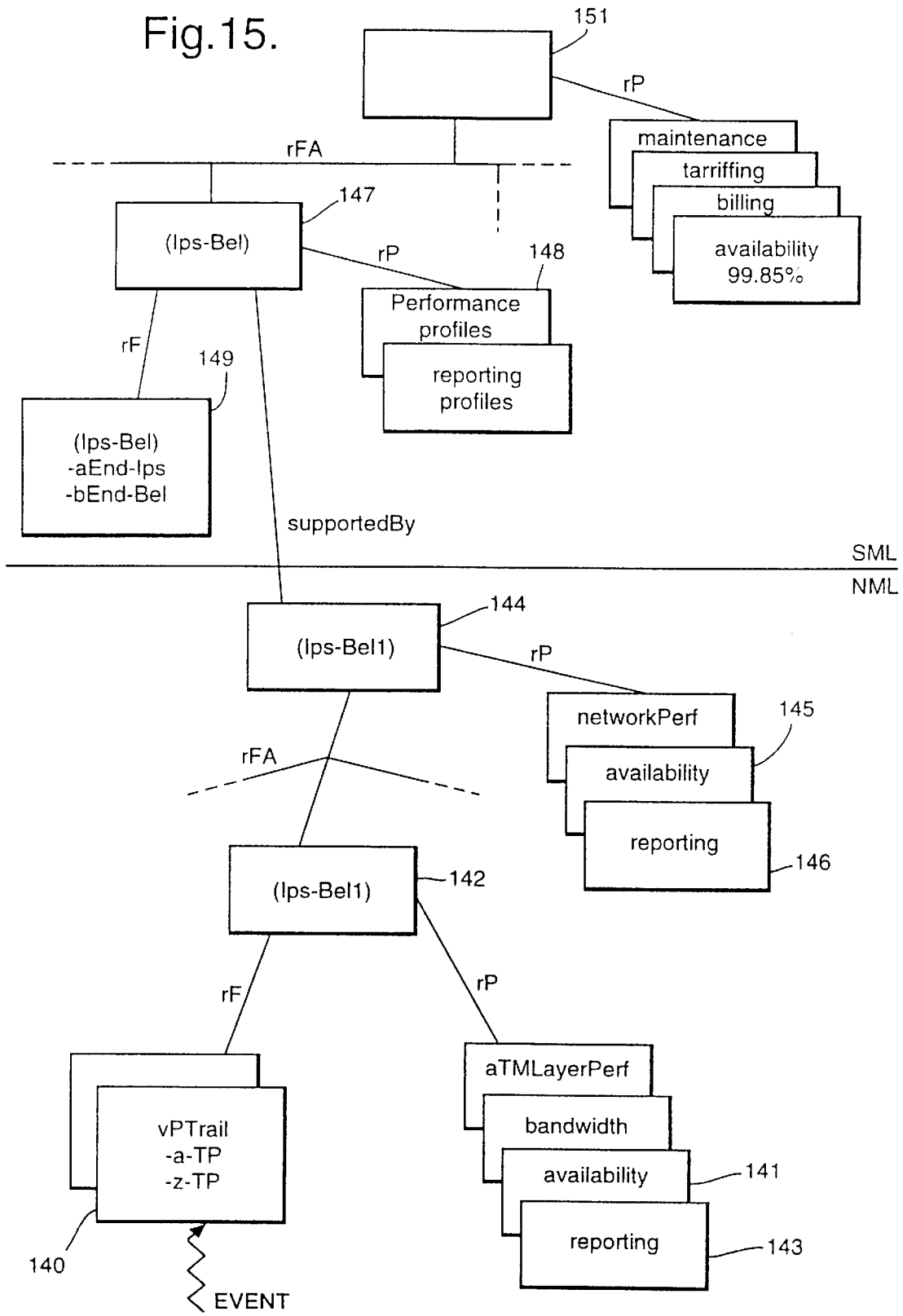
FIG. 15 shows part of the model of FIG. 13 in use in response to an vent.

Referring to FIG. 15, which shows an extended version of part of FIG. 13, a scenario based on a network fault in an ATM virtual path is responded to as follows:

(i) A cable fault in the network will cause an event report in the management system and (in this example) will affect a virtual path feature "vptrail" 140.

(ii) Reference is made to the conditions in an "availability" profile 141 of the feature agreement "ConBidSymFA" 142 to see how the availability of the virtual path feature "vptrail" 140 is affected.

(iii) Reference is made to the "Reporting" profile 143 of "ConBidSymFA" 142, which indicates the corresponding end-to-end feature agreement "e-eConBidSymFA" 144 is to be notified.

(iv) Reference is made to the conditions in the "availability" profile 145 of "e-eConBidSymFA" 144 which imply that a feature of that feature agreement "e-eConBidsymFA" 144 is broken.

(v) Reference is made to the "Reporting" profile 146 of "e-eConBidSymFA" 144 which indicates that a supported service FA (i.e., "routeFA" 147) is to be notified.

(vi) Reference is made to the conditions in the "performance" profile 148 of "routeFA" 147 which imply that the performance of the feature "routeF" 149 has degraded.

(vii) Reference is made to the "Reporting" profile 150 of "routeFA" 147 which indicates that the customer should be notified via an alarm on the relevant service feature agreement "fBSFA" 151.

(viii) The customer is consequently notified that performance on the Ipswich to Belfast route is currently degraded.

Note that a fault diagnosis and repair process would begin as soon as the original event has been received at the network level. This is very advantageous in that the customer can be forewarned over performance difficulties, which clearly offers them useful management information, and the fault can be repaired as soon as possible.

A somewhat similar scenario can/will take place when the problem (i.e., route performance degradation) has been detected by the customer and is reported to service management (i.e., via the feature agreement fBSFA 151). In this case, the report propagation will be top-down.

Figure 19:
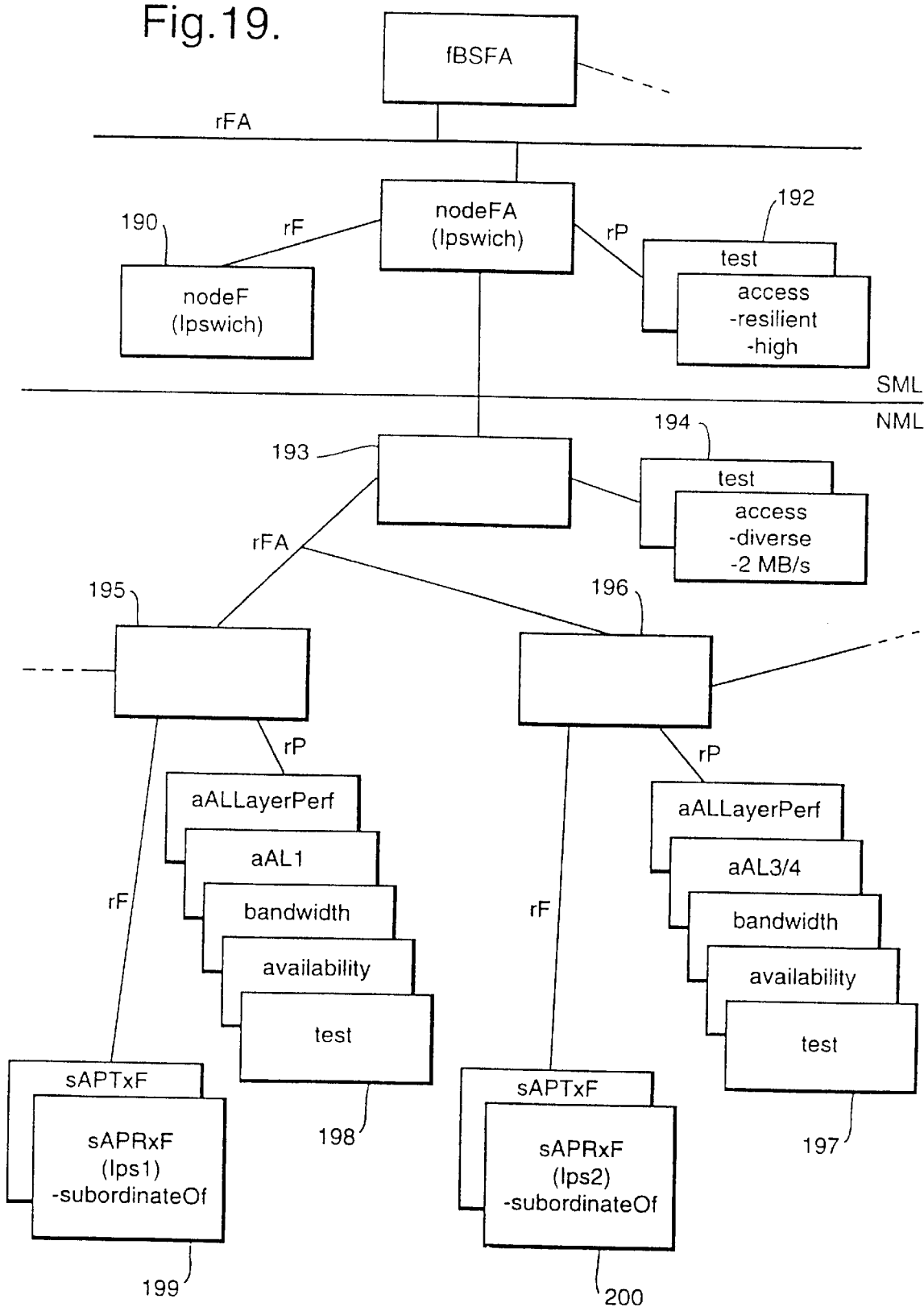
FIG. 19 shows part of the model of FIG. 13 in use in response to a test request.

Referring to FIG. 19, embodiments of the present invention can also be used to provide test management, as described in the following scenario.

(i) A customer requests a test for high resilience in access available to the customer, identifying Ipswich as the access site.

(ii) Reference is made to the relevant feature agreement "nodeFA (Ipswich)" 191 and to the related "test" profile 192 which together identify the supporting network feature agreement "sAFA (Ips)" 193.

(iii) Reference is made to the supporting FA "sAFA (Ips)" 193 and to the related "test" profile 194 which together identify the sub-feature agreements "sAPBidSymFA (Dps1)" and "sAPBidSymFA (Ips2)" 195, 196 which require testing.

(iv) Reference is made to "test" profile 194 of "sAFA (Ips)" 193 which indicates the physical test (ie 2Mbit diverse access) which is required of access to the node.

(v) Reference is made to the "test" profiles 197,198 which identify the network features which require testing, "sAPRxF (Ips1)" 199 and "sAPRxF (Ips2)" 200.

(vi) Reference is made to the network features 199, 200 to identify the physical network elements which should be tested by applying the physical test indicated at step 4 above.

(vii) The results of the test are reported back to the customer by means of a reporting mechanism equivalent to that described above with reference to FIG. 15.

It should be noted that in the scenario described above, there are test profiles 194, 197, 198 associated with FAs 193, 195, 196 in the NML, where two of the FAs 195, 196 are both sub-FAs in respect of the third FA 193. In the particular scenario described, an access test, it would in practice be the case that the set of tests applied to the physical network elements associated with the features "SaPR (Ips 1)" 199 and "SAPR (Ips2)" 200 would be the same. This is because the access conditions are the same in each direction for the Ipswich node, whether facing Edinburgh or facing Belfast. Where that is the case, as described, the physical test information referenced at step 4 above can be stored in the test profile 194 which lies at the slightly higher level in the data structure, associated with "SAFA (Ips)" 193. In other scenarios however, it may be that the sets of tests to be applied to the physical network elements associated with the features "sAPR (Ips1)" 199 and "sAPR (Ips2)" 200 would be different. In that case, the physical test information reference at step 4 above instead would need to be located via the two separate test profiles 197, 198 at the lower level in the data structure, associated with the FAs "sAPBid Sym FA (Ips2)" 196 and "sAPBidSymFA (Ips1)" 195.

Figure 17:
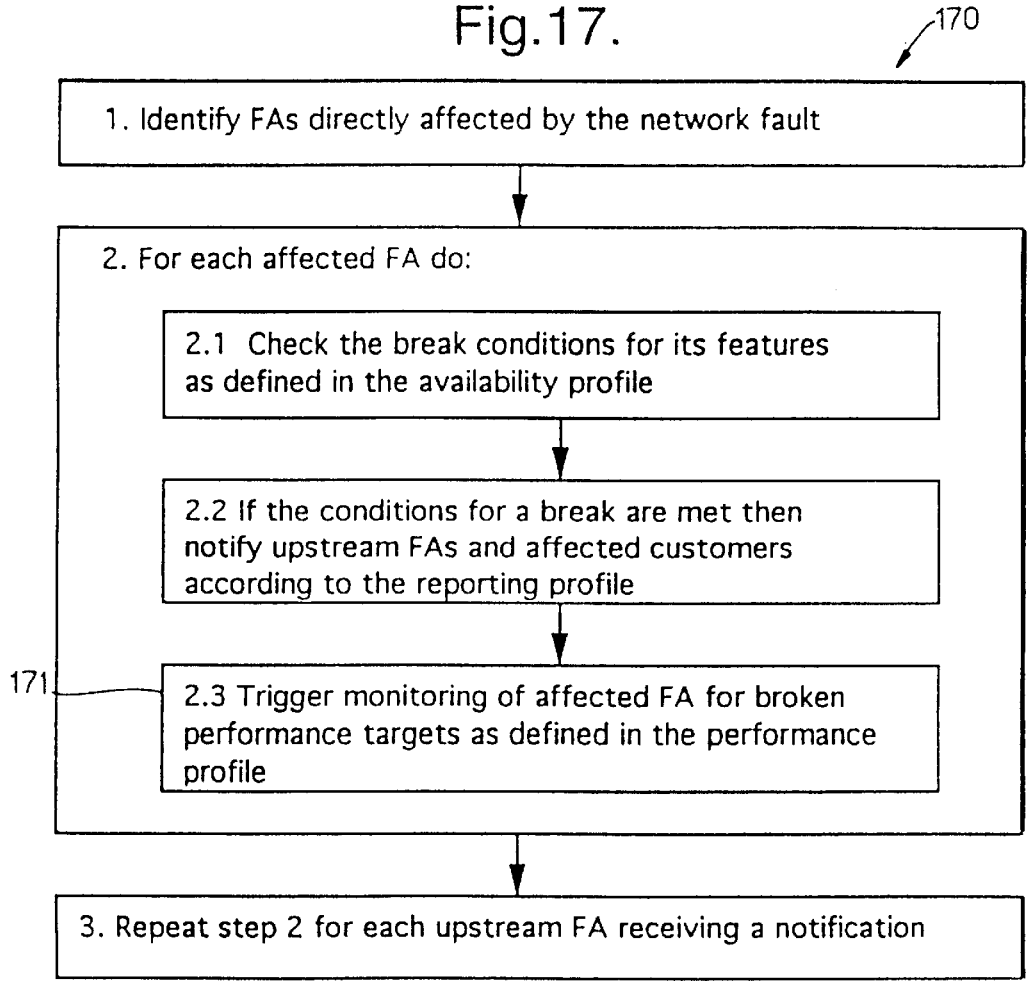
FIG. 17 shows a flow chart of functionality of the network management system in fault management.
Figure 18:
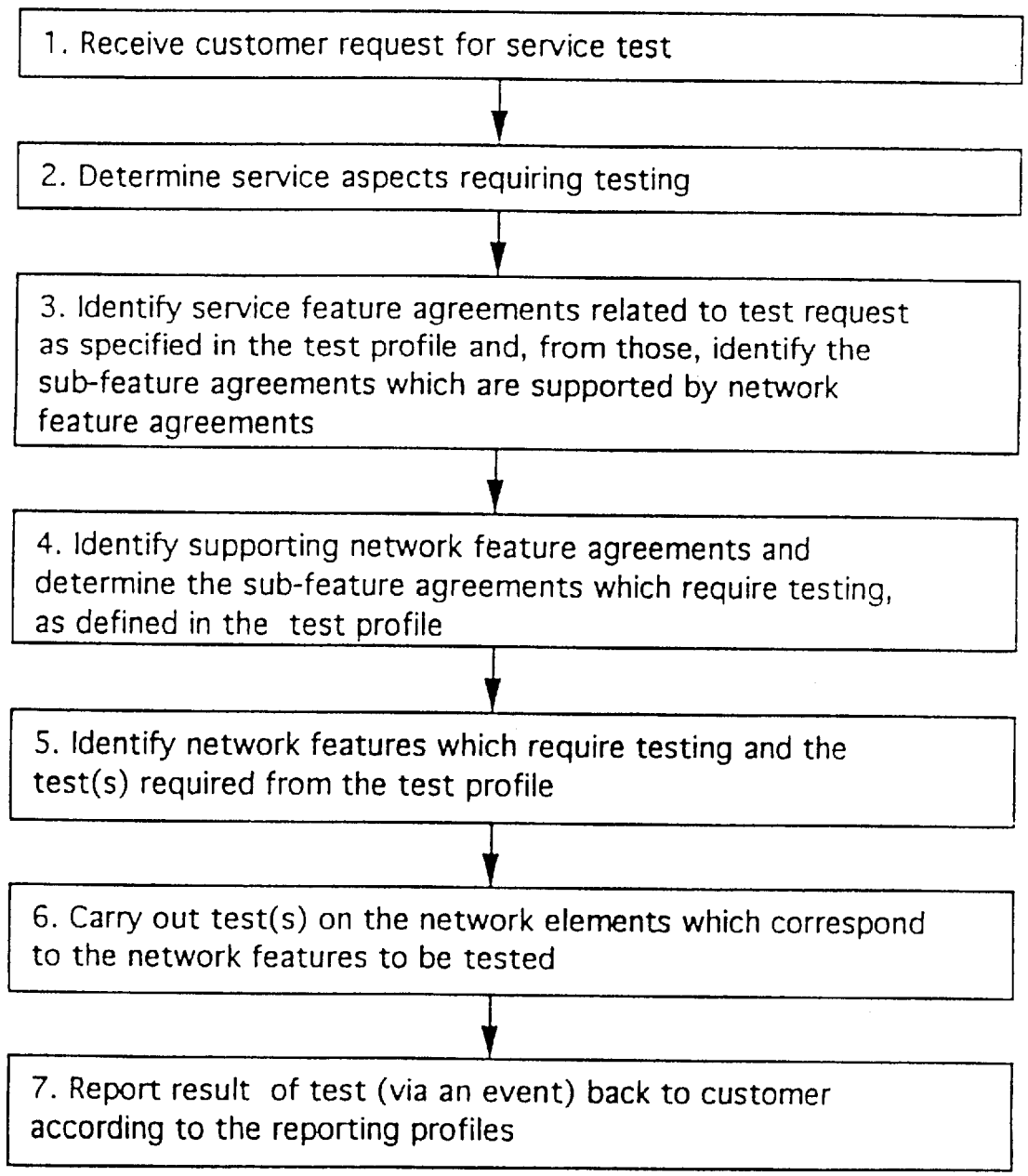
FIG. 18 shows a flow chart of functionality of the network management system in testing.

Referring to FIGS. 17 and 18, the above functionality can be expressed more generally in flow diagrams 170, 180. These flows diagrams 170, 180 are self-explanatory in the light of the description above with respect to FIGS. 15 and 19, except perhaps with respect to the monitoring referred to in step 171. Although a network fault may affect a feature and its related FA, the FA may not be immediately broken. If it incorporates performance targets, for instance, these may only apply after a specified interval. Hence, it is preferable to start monitoring an unbroken FA as soon as a relevant feature is affected. If the FA subsequently breaks, the management system may treat the break as a "new" event. This time, the management process will clearly start at a higher level in the data structure than the starting point of FIG. 17.

We claim:

1. A network management system for a communications network, the management system being structured according to a layered model of a managed network, which management system comprises:

i) inputs for trigger signals in respect of the network and/or a service provided thereby;

ii) data processing means for accessing and processing information in response to said trigger signals; and iii) outputs for issuing signals in respect of the network and/or said services wherein said data processing means comprises a data structure having a hierarchy of feature agreement data stores, each for use in retrieving data defining feature-specific requirements, at a layer of the network model, to support a set of operational-related conditions such as those of a service level agreement or the like.

2. A network management system according to claim 1, wherein each feature agreement data store has an associated set of profile data stores, and at least one of:

an associated set of feature data stores; and an associated set of feature agreement data stores.

3. A network management system according to claim 1, wherein the signals issued comprise reports on conditions prevailing in the managed network.

4. A network management system according to claim 1, wherein the signals issued comprise control signals in respect of elements of the managed network.

5. A network management system according to claim 1, wherein the management system responds to a trigger signal received at an input by accessing data contained in the data structure at a plurality of levels in the hierarchy, the data accessed at each level determining what data is next accessed.

6. A network management system according to claim 1, for providing fault management of a managed network.

7. A network management system according to claim 5 for providing fault management of a managed network and, wherein the layered model comprises at least a service management layer and a network management layer, and a trigger signal received at an input comprises a fault report in respect of an element of a managed network, the management system responding by first accessing data contained in the data structure at a level in the hierarchy corresponding to the network management layer of the network model.

8. A network management system according to claim 5 for providing fault management of a managed network and, wherein the layered model comprises at least a service management layer and a network management layer, and a trigger signal received at an input comprises a fault report in respect of a service provided by means of the managed network, the management system responding by first accessing data contained in the data structure at a level in the hierarchy corresponding to the service management layer of the network model.

9. A network management system according to claim 1, for providing test management of a managed network.

10. A network management system according to claim 9, wherein the layered model comprises at least a service management layer and a network management layer, and a trigger signal received at an input comprises a test request in respect of a service provided by means of the managed network, the management system responding by first accessing data contained in the data structure at a level in the hierarchy corresponding to the service management layer of the network model.

11. A network management system according to claim 1, for providing performance management in relation to a managed network.

12. A network management system according to claim 11 wherein the layered model comprises at least a service management layer and a network management layer, and a trigger signal received at an input comprises a performance report in respect of an element of the managed network, the management system responding by first accessing data contained in the data structure at a level in the hierarchy corresponding to the network management layer of the network model.

13. A network management system according to claim 11 wherein the layered model comprises at least a service management layer and a network management layer, and a trigger signal received at an input comprises a performance report in respect of a service provided by means of the managed network, the management system responding by first accessing data contained in the data structure at a level in the hierarchy corresponding to the service management layer of the network model.

14. A network management system according to claim 11:

wherein each feature agreement data store has an associated set of profile data stores, and at least one of:
an associated set of feature data stores; and
an associated set of feature agreement data stores;

wherein the layered model comprises at least a service management layer and a network management layer, and a trigger signal received at an input comprises a performance report in respect of a service provided by means of the managed network, the management system responding by first accessing data contained in the data structure at a level in the hierarchy corresponding to the service management layer of the network model;

wherein the data stores are used as the basis of communicating to a customer of a service provided by the managed network the status of a service offered, and its performance with respect to a service customer contract and supporting customer interface management profiles and service feature agreements.

15. A management system for a communications network, for use in monitoring and controlling the provision of services by means of the network, wherein the management system comprises:

i) inputs for trigger signals containing information in respect of the network and/or a service provided thereby;

ii) data processing means for accessing and processing information in response to said trigger signals; and iii) outputs for issuing control and/or report signals in respect of the network and/or said services wherein the management system is provided with a data structure comprising sets of feature-describing data, each set identifying and describing a manageable aspect of the communications network, management rule profiles to be associated with selected sets of feature-describing data, each management rule profile containing management rules in respect of the feature described by the relevant set of feature-describing data, and association data sets for associating one or more management rule profiles with one or more selected sets of feature-describing data, said data processing means being adapted to respond to a trigger signal by identifying a set of feature-describing data and accessing a management rule profile, identified by an association data set in respect of the set of feature-describing data, and, if indicated by the profile or by an association data set or otherwise by the data structure, in association with information from the trigger signal, accessing at least one further association data set and a management rule profile identified by said further association data set, such that the management system is enabled to respond appropriately to the trigger signal.

16. A management system according to claim 15 wherein the association data sets are arranged in a hierarchical structure.

17. A management system according to claim 15 wherein different respective sets of feature-describing data identify network capabilities, and services or service-supporting features, respectively.

18. A management system according to claim 15 wherein at least one of the management rule profiles contains, in use, data in relation to network constraints.

19. A management system according to claim 15 wherein at least one of the management rule profiles contains, in use, data in relation to service constraints.

20. A management system according to claim 15 wherein a trigger signal comprises a network fault indicator and the management system is enabled to respond by outputting an appropriate performance or fault report to a user terminal, such as a service provider or customer terminal.

21. A management system according to claim 15 wherein a trigger signal comprises a service fault or fault-related indicator and the management system is enabled to respond by outputting an appropriate performance or fault report to a user terminal such as a service provider or customer terminal.

22. A management system according to claim 15 wherein a trigger signal comprises a test request and the management system is enabled to to respond by outputting an appropriate test report to a user terminal such as a service provider or customer terminal.

23. A method of managing a communications system, for use in monitoring and controlling the provision of services by means of the network, which method comprises:

i) receiving a trigger signal at an input to a management system for service provision over said network;

ii) accessing a data structure of said management system in response to receipt of the trigger signal, to identify a set of feature-describing data for a feature to which the trigger signal is potentially relevant;

iii) identifying a management rule profile by reference to an association data set, containing association data for relating one or more management rule profiles to said feature; and iv) accessing the management rules of that profile and applying them together with information from the trigger signal, with respect to the relevant set of feature-describing data, to determine further action by the management system.

24. A method according to claim 23 wherein the further action comprises identifying a further association data set, containing association data for relating one or more management rule profiles to one or more further features to which the information from the trigger signal is relevant, and accessing the management rules of said one or more profiles and applying them together with information from, or derived from, the trigger signal, with respect to a relevant set of feature-describing data to determine further action by the management system.

25. A method according to claim 24 wherein features to which information from, or derived from, the trigger signal is determined to be relevant include both network related features and service related features.

26. A method according to claim 24 wherein the further association data set is identified by a management rule of a management rule profile.

27. A method according to claim 24 wherein the further association data set is identified by links built into the data structure of the management system.

* * * * *